Feb. 17, 1942.  C. B. DE VLIEG  2,273,399
MACHINE TOOL
Filed Nov. 21, 1938   16 Sheets-Sheet 1
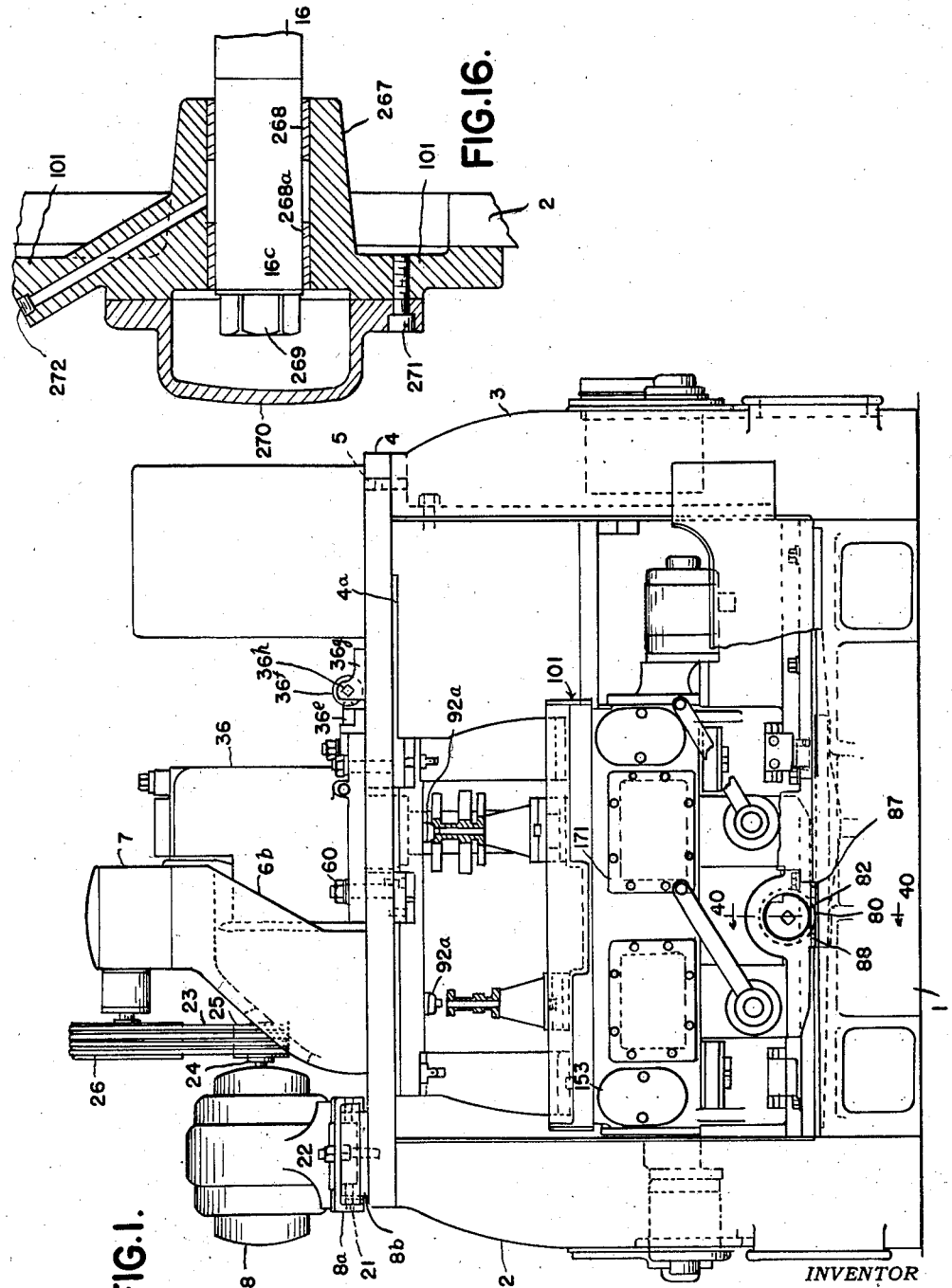
INVENTOR
CHARLES B. DeVLIEG
BY Whittemore, Hulbert & Belknap
ATTORNEYS Feb. 17, 1942. C. B. DE VLIEG 2,273,399
MACHINE TOOL
Filed Nov. 21, 1938 16 Sheets-Sheet 2
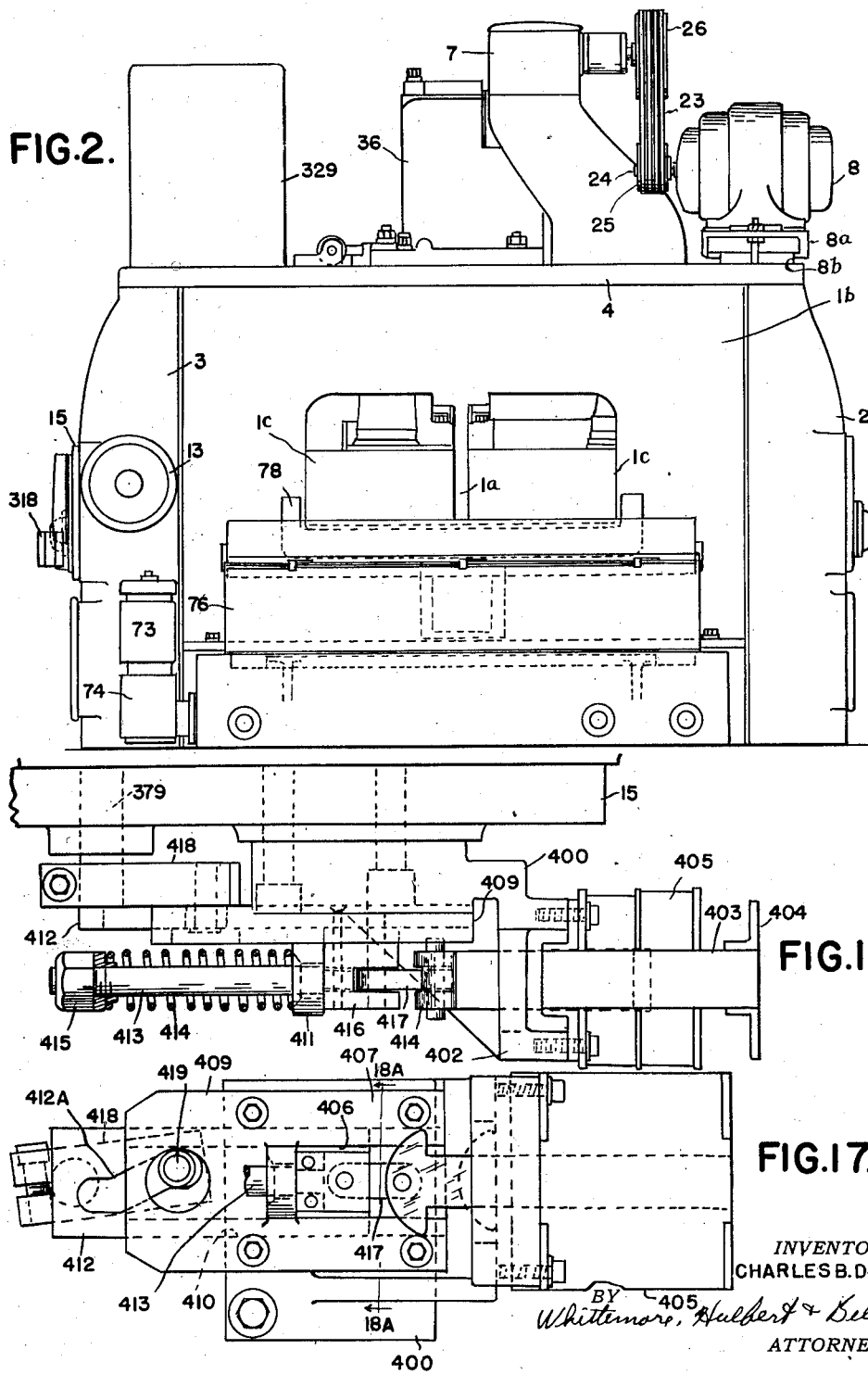
INVENTOR
CHARLES B. DeVLIEG
BY Whittemore, Hulbert & Belknap
ATTORNEYS Feb. 17, 1942.  C. B. DE VLIEG  2,273,399
MACHINE TOOL
Filed Nov. 21, 1938  16 Sheets-Sheet 3
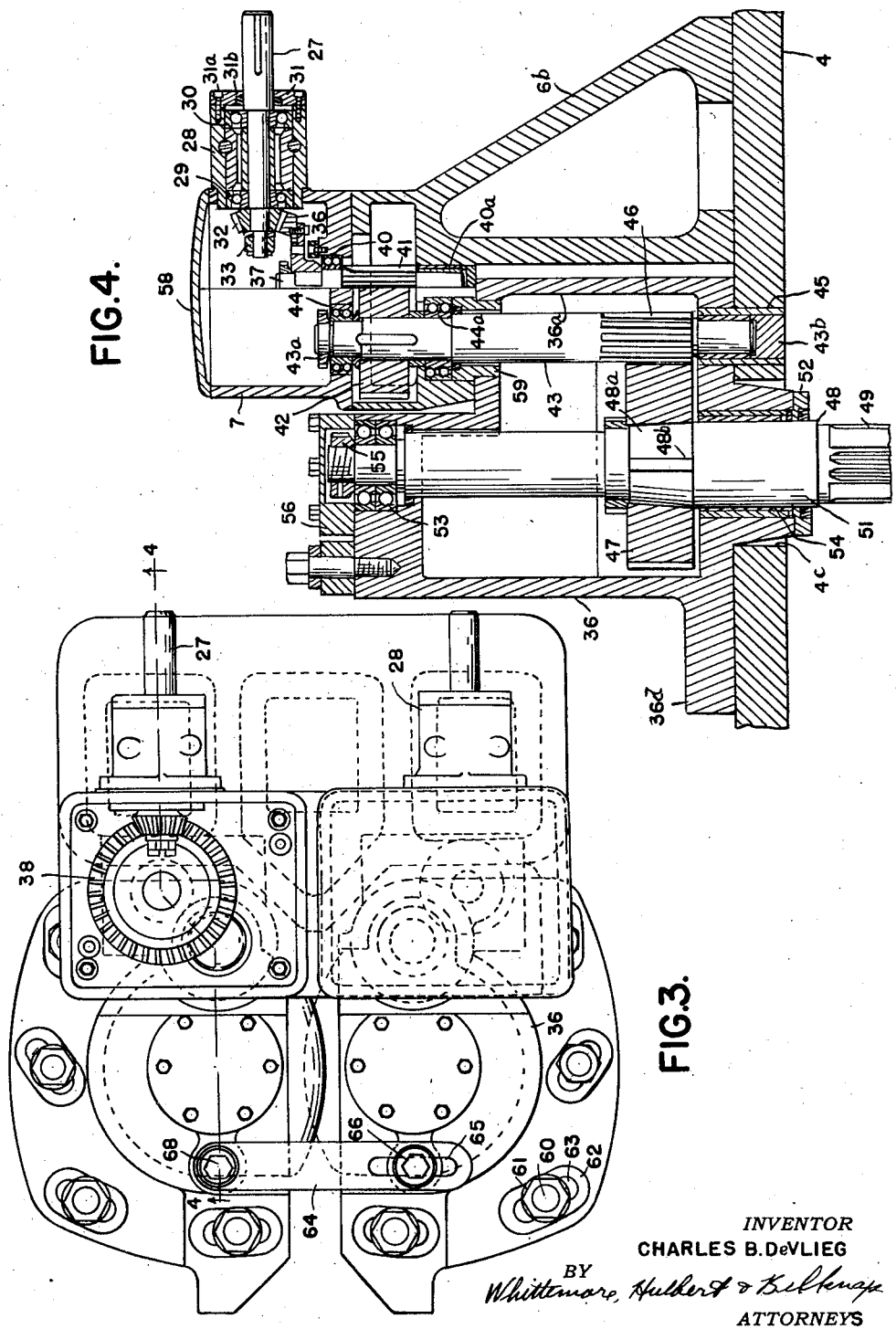
INVENTOR
CHARLES B. DeVLIEG
BY
Whittemore, Hulbert & Belknap
ATTORNEYS

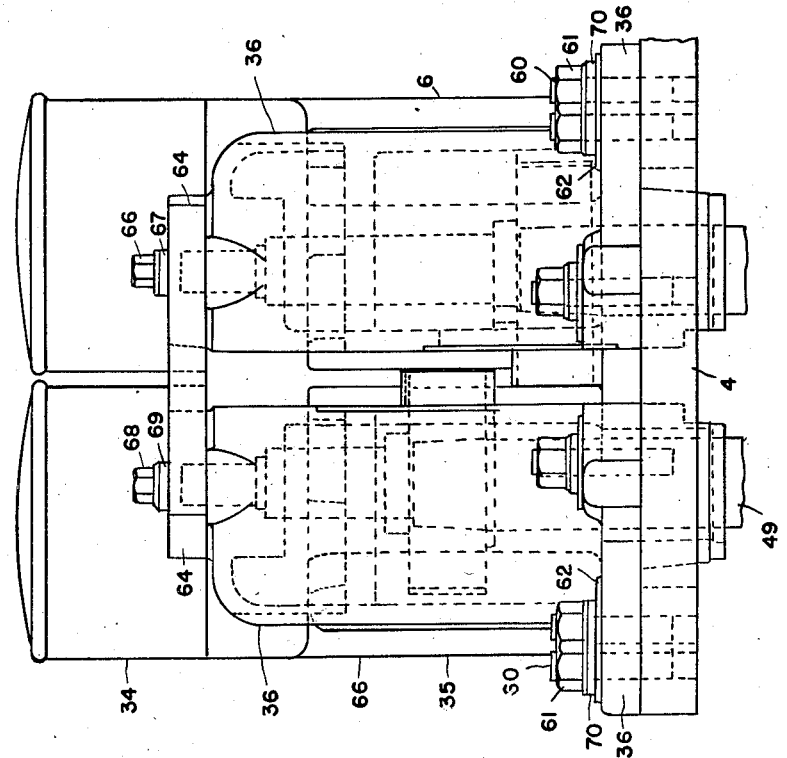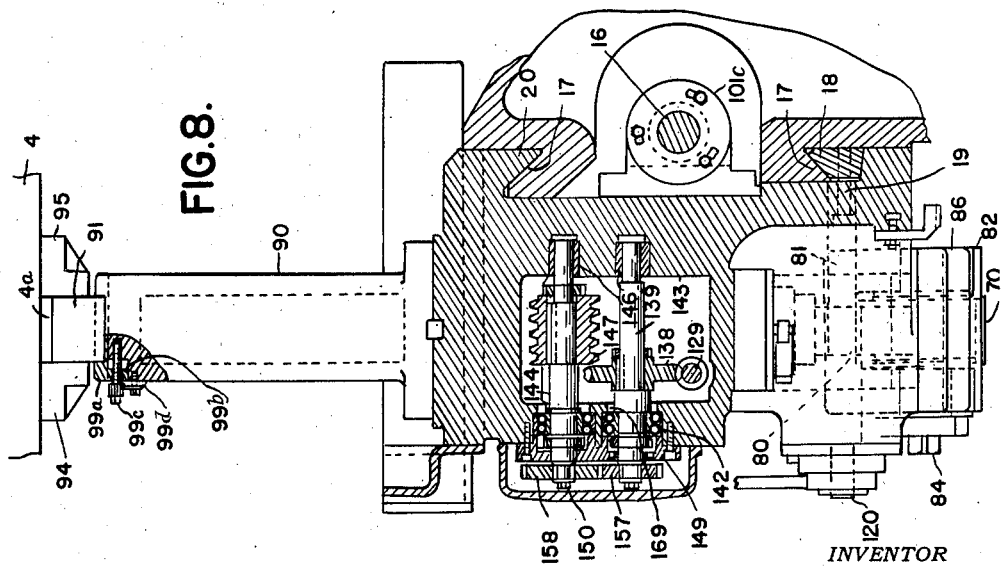

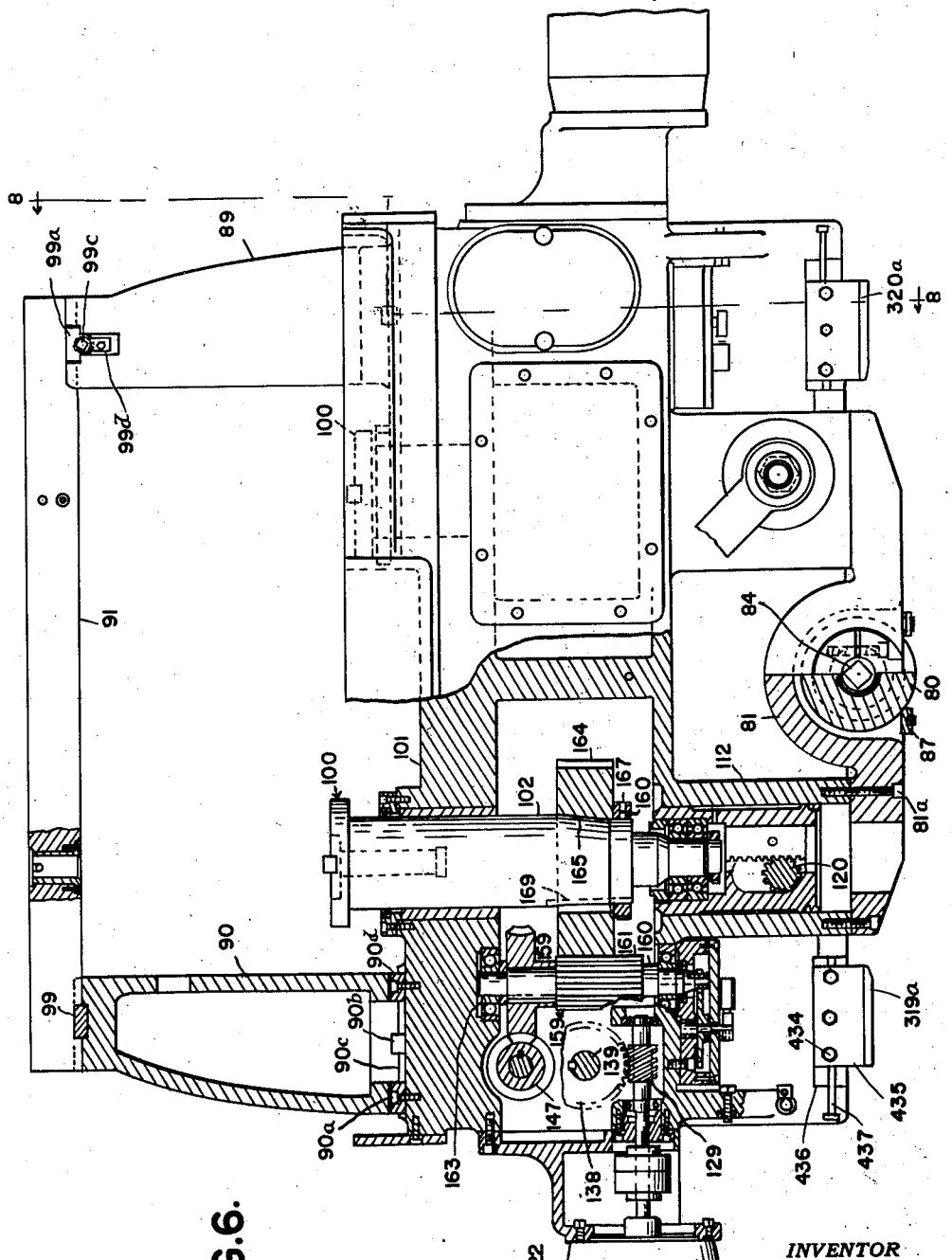

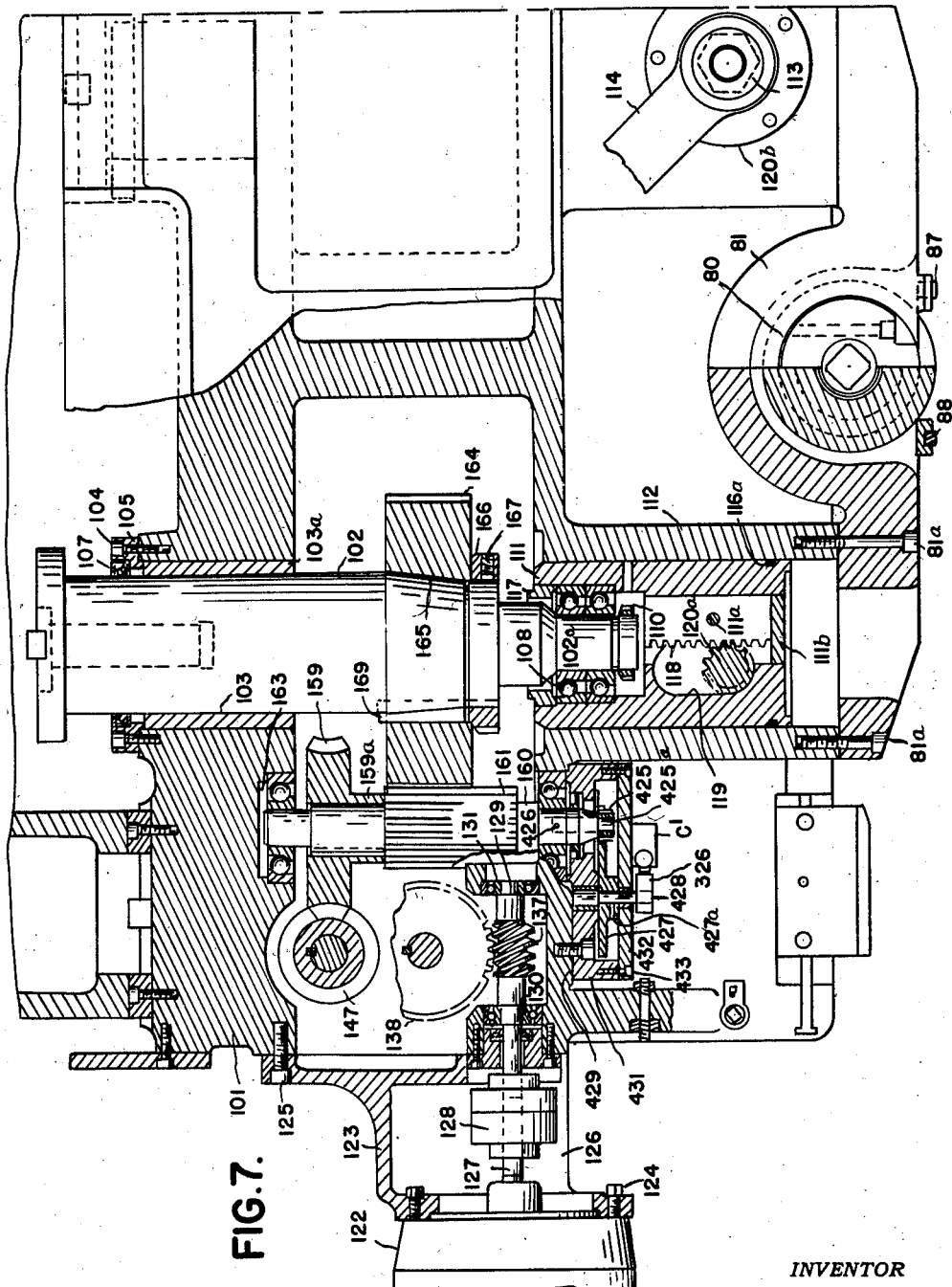

Feb. 17, 1942. C. B. DE VLIEG 2,273,399
MACHINE TOOL
Filed Nov. 21, 1938 16 Sheets-Sheet 7
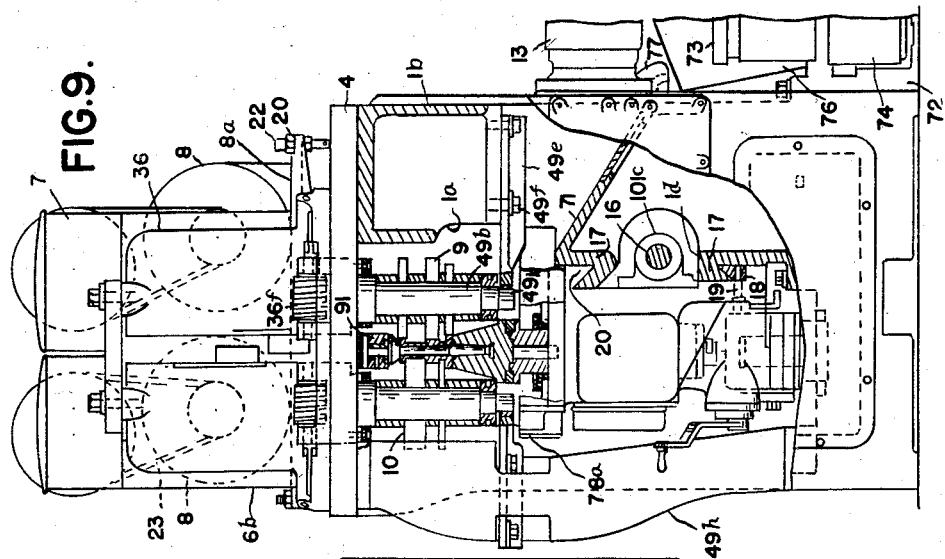
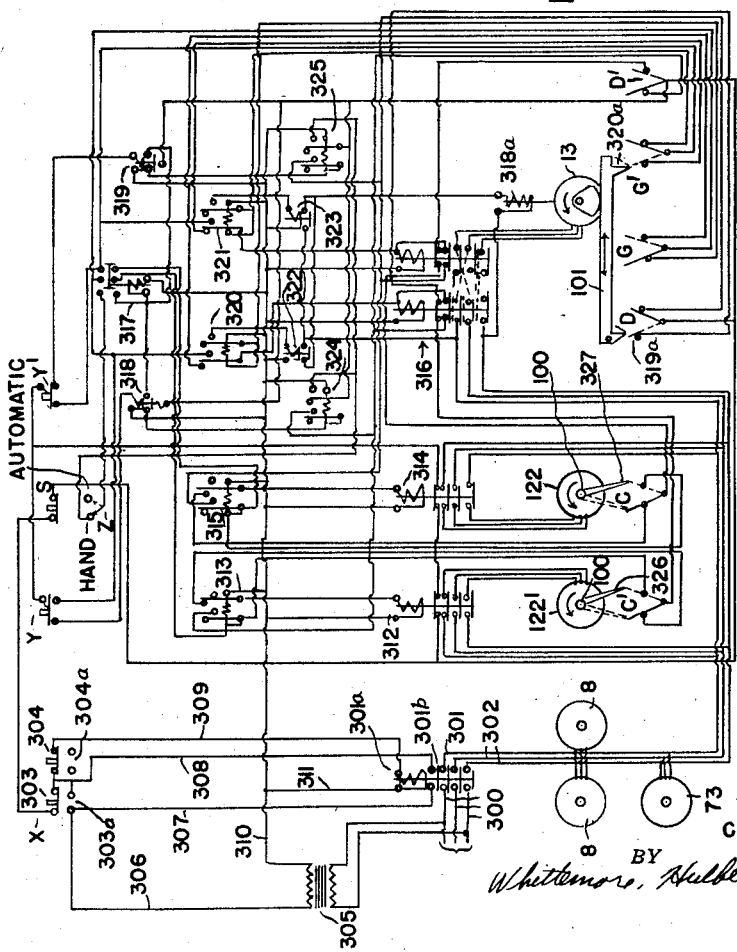
INVENTOR
CHARLES B. DeVLIEG
ATTORNEYS Feb. 17, 1942.   C. B. DE VLIEG   2,273,399
MACHINE TOOL
Filed Nov. 21, 1938   16 Sheets-Sheet 8
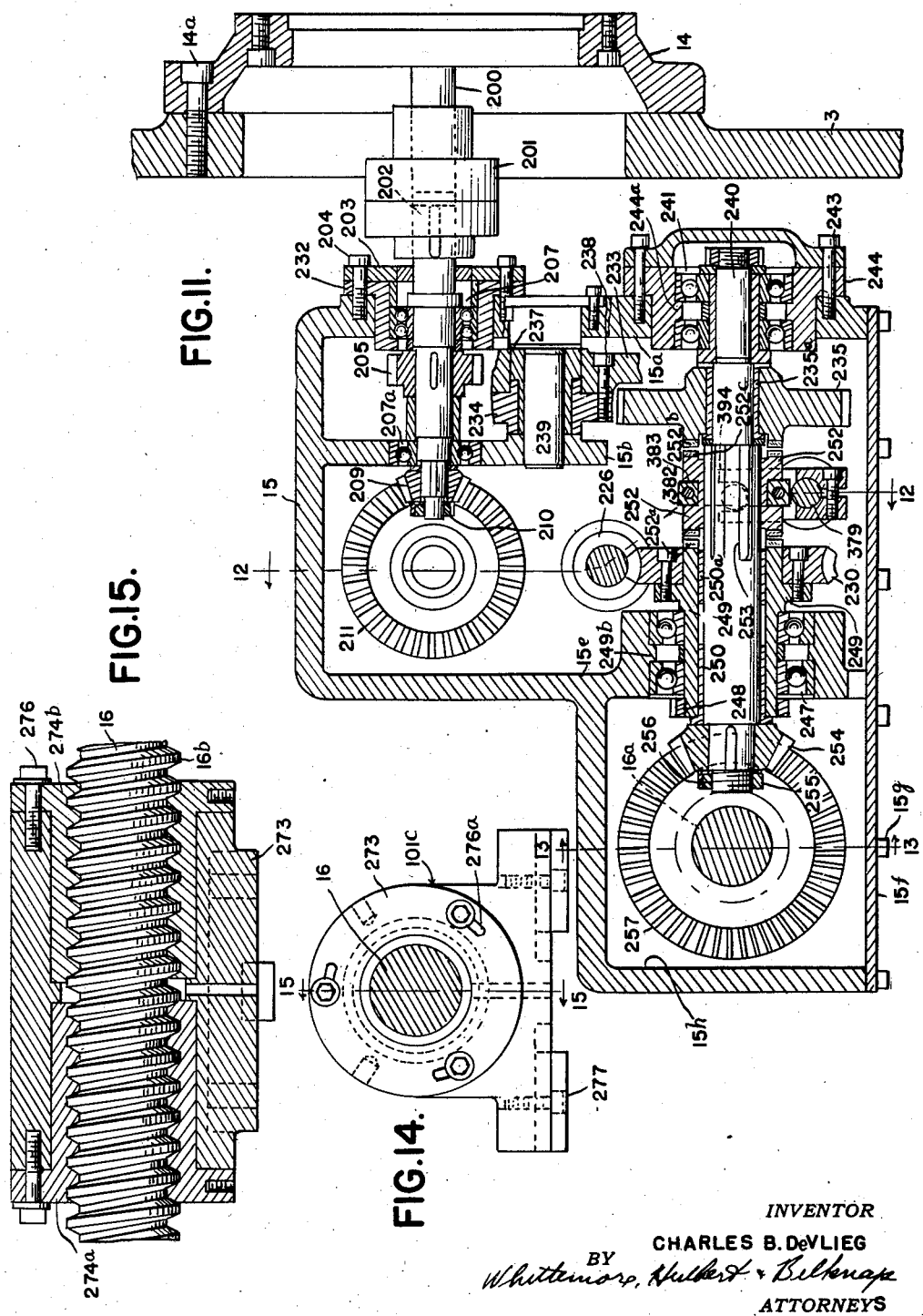
INVENTOR
CHARLES B. DeVLIEG
BY
Whittemore, Hulbert & Belknap
ATTORNEYS

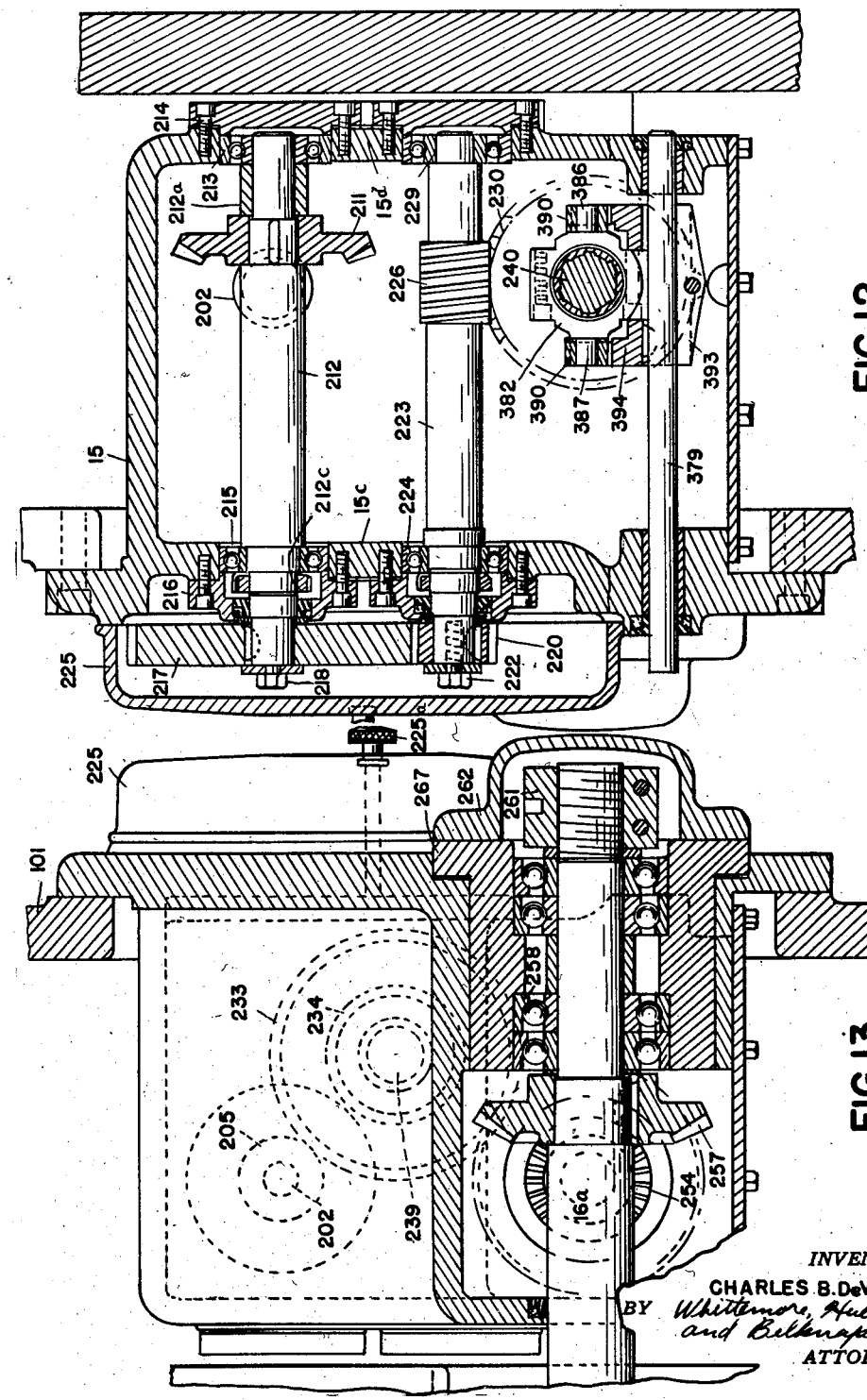

Feb. 17, 1942. C. B. DE VLIEG 2,273,399
MACHINE TOOL
Filed Nov. 21, 1938 16 Sheets-Sheet 10
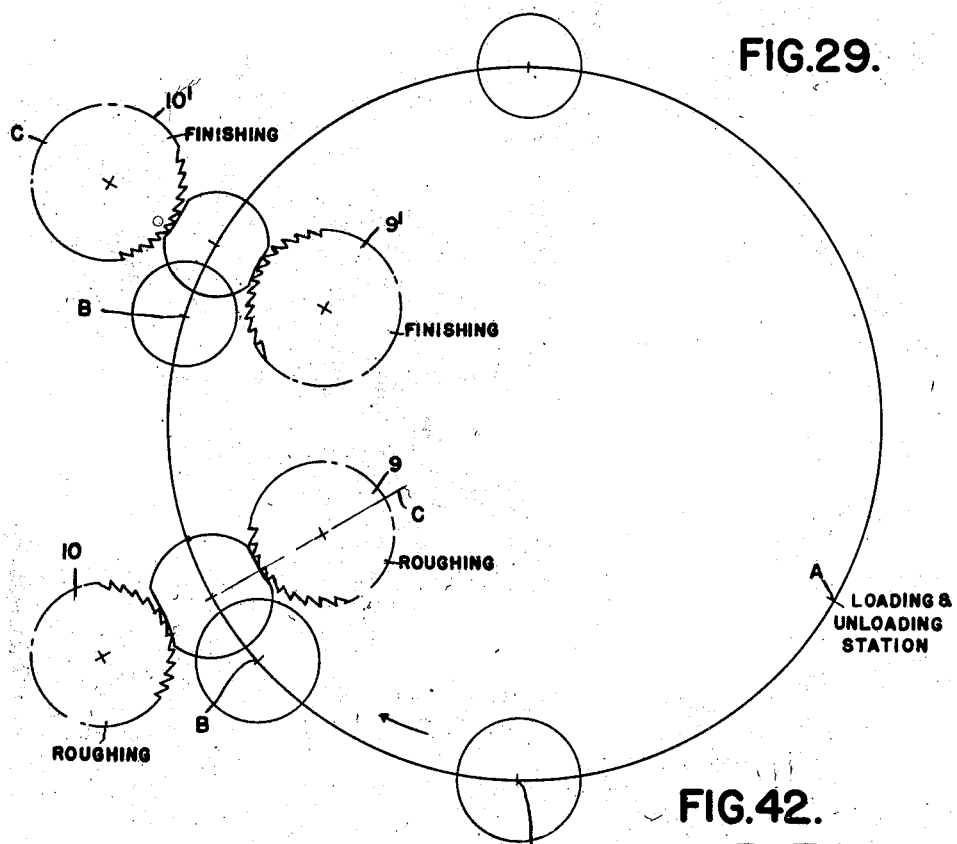
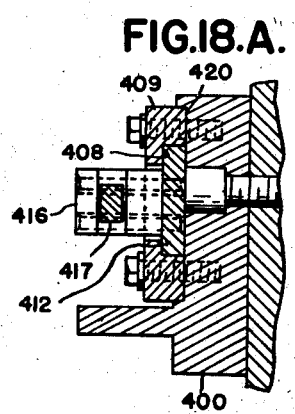
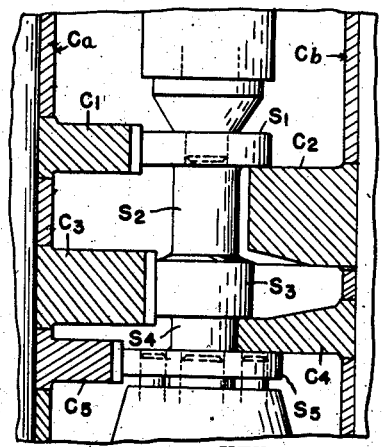
INVENTOR
CHARLES B. DeVLIEG
BY
Whittemore, Hulbert & Belknap
ATTORNEYS

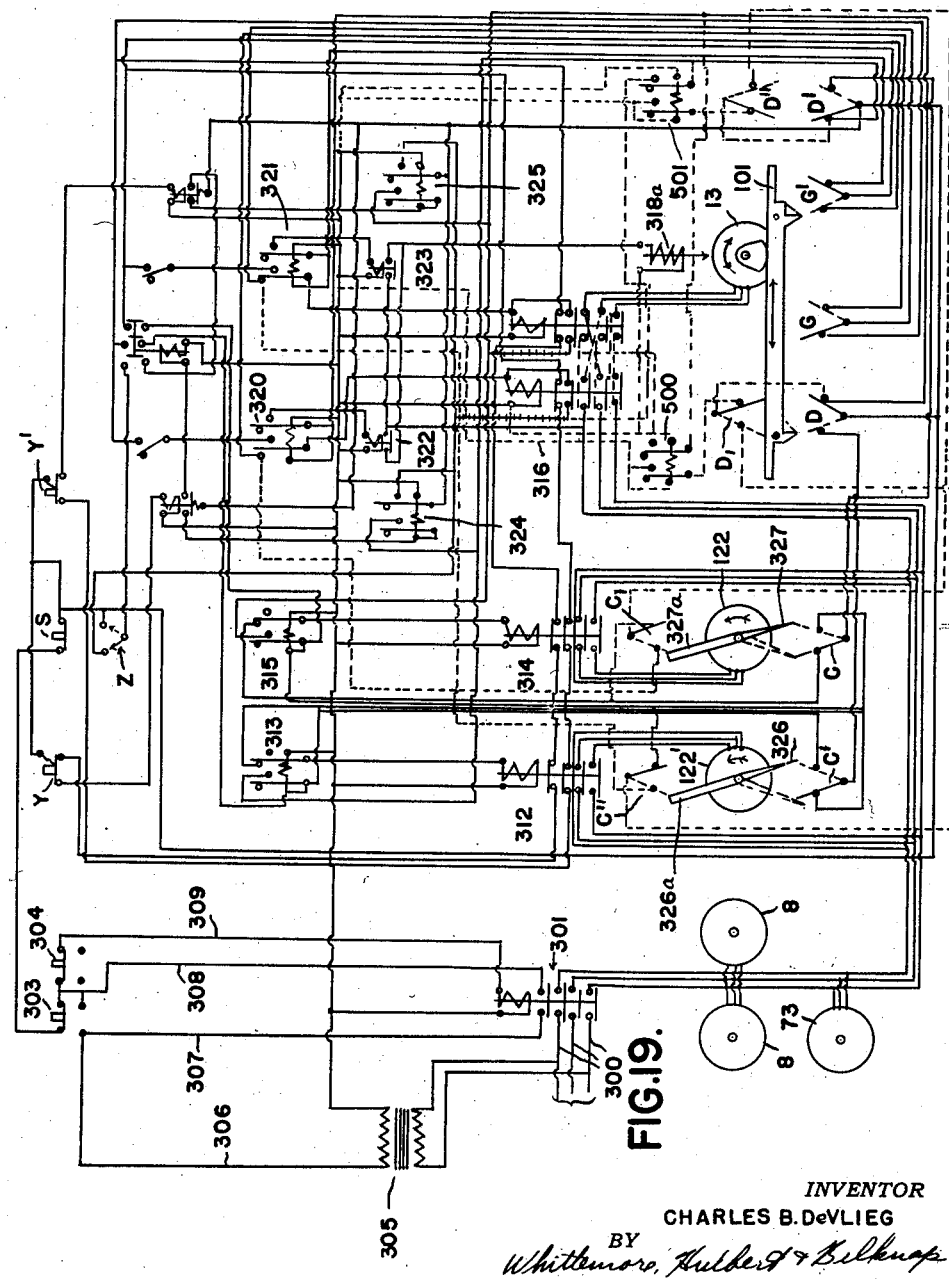

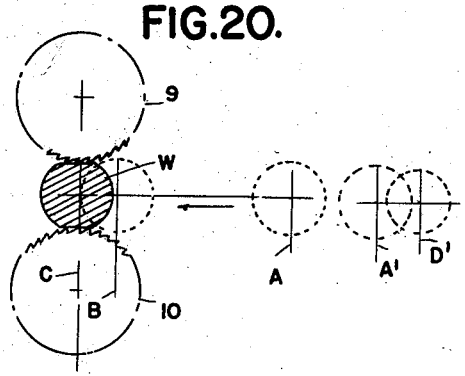
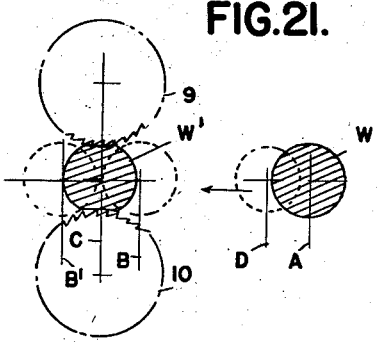
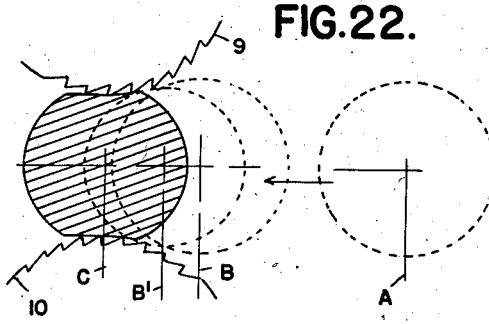
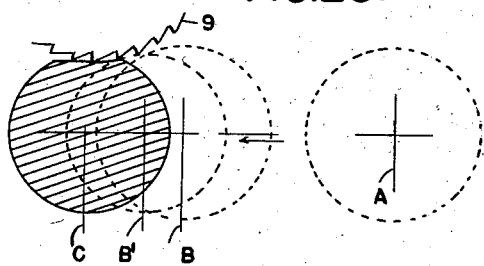
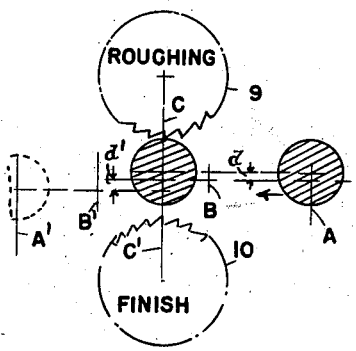
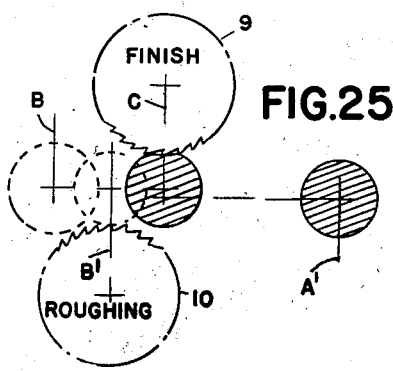

Feb. 17, 1942.  C. B. DE VLIEG  2,273,399
MACHINE TOOL
Filed Nov. 21, 1938  16 Sheets-Sheet 13
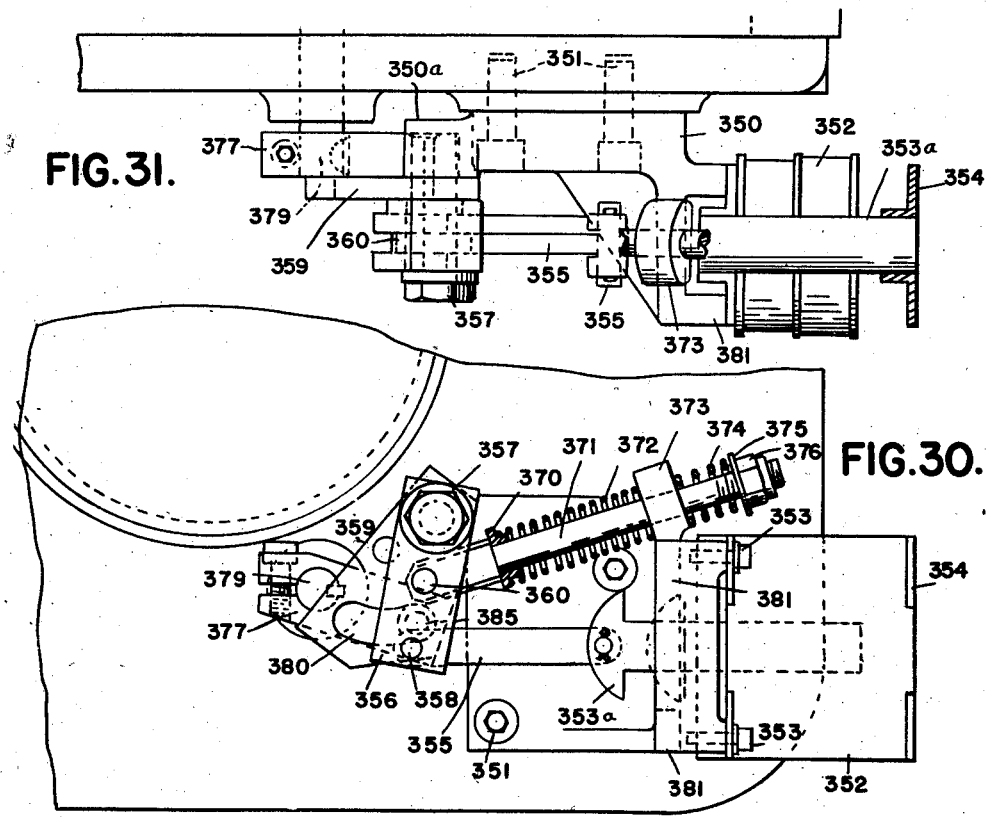
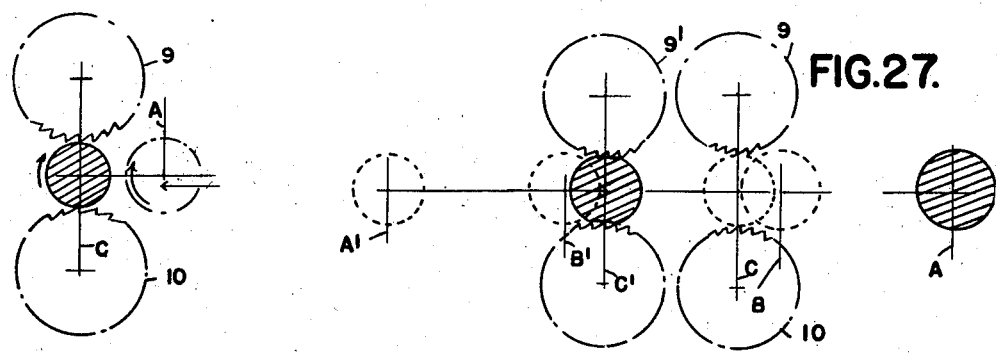
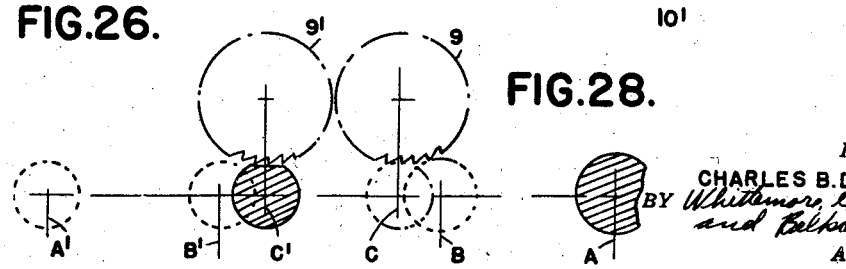
INVENTOR
CHARLES B. DeVLIEG
BY Whittemore, Hulbert
and Belknap
ATTORNEYS INVENTOR
CHARLES B. DeVLIEG Feb. 17, 1942.     C. B. DE VLIEG     2,273,399
MACHINE TOOL
Filed Nov. 21, 1938    16 Sheets-Sheet 15
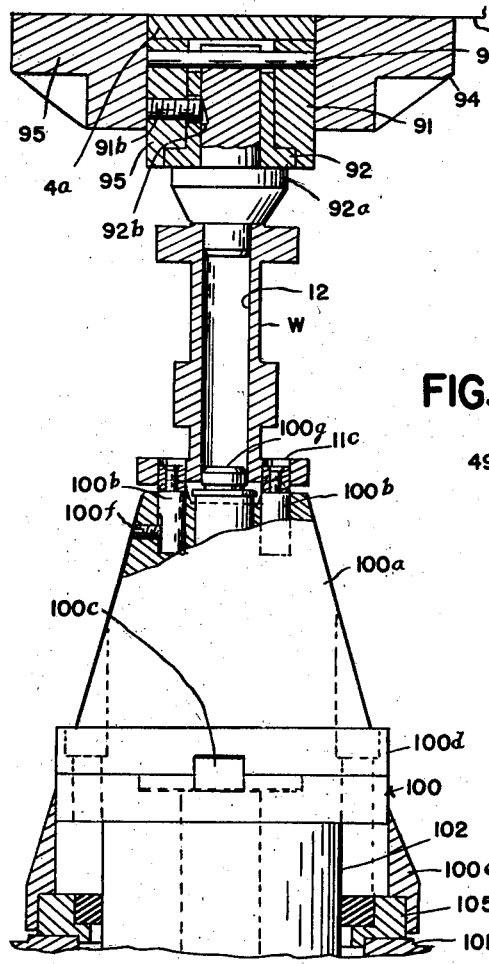
FIG.35.
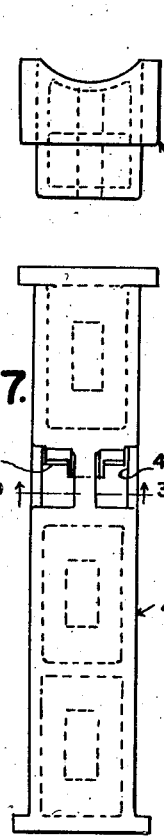
FIG.38.
FIG.37.
FIG.36.
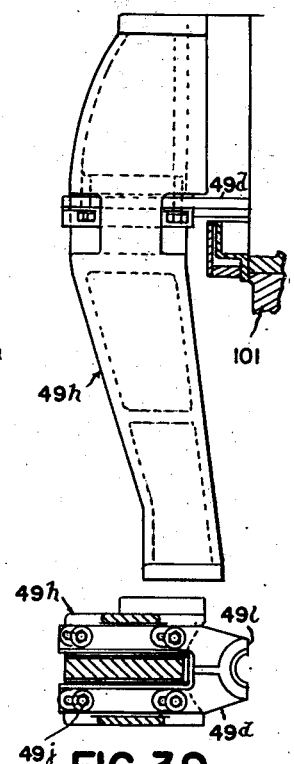
FIG.39.
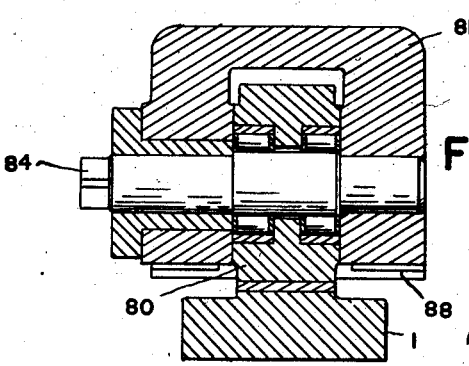
FIG.40.
INVENTOR
CHARLES B. DeVLIEG
BY
Whittemore, Hulbert & Belknap
ATTORNEYS Feb. 17, 1942.   C. B. DE VLIEG   2,273,399
MACHINE TOOL
Filed Nov. 21, 1938   16 Sheets-Sheet 16

INVENTOR
CHARLES B. DeVLIEG
BY
Whittemore, Hulbert & Belknap
ATTORNEYS

Patented Feb. 17, 1942

2,273,399

UNITED STATES PATENT OFFICE 2,273,399

MACHINE TOOL

Charles B. De Vlieg, Detroit, Mich., assignor to National Broach and Machine Company, Inc., Detroit, Mich., a corporation of Michigan Application November 21, 1938, Serial No. 241,667

59 Claims. (Cl. 90—20)

The present invention relates to machine tools and more particularly to a novel machine tool and method adapted to cut a work piece to circular cross section.

The present invention involves a milling machine adapted to rotate a work piece and present the same to one or more milling cutters to machine the work piece to a circular cross section. In some of its aspects the invention may be carried out with a single cutter while in others the work piece is presented between a pair of opposed cutters.

Broadly described, the invention involves one or more milling cutters which are rotated in fixed position. A work piece is mounted for movement into cutting engagement with the cutters and in the case of opposed cutters the work piece is mounted for movement to a position substantially between the opposed cutters.

Preferably while the work piece is fed into the rotating cutter it is held against rotation. After it has been moved to a predetermined position corresponding to a predetermined depth of cut by the milling cutter or cutters the work piece is rotated slowly. Rotation of the work piece may in some cases be 180° or slightly more; in other cases, for example when a single milling cutter is employed or when opposed milling cutters of different profile are employed, the work piece is continued at least 360° or preferably slightly more.

In order to carry out the present invention I have designed an automatic machine having a number of novel features.

It is accordingly an object of the present invention to provide a machine for milling a work piece to circular cross section by rotating the work piece in cutting relation with one or more milling cutters.

It is a further object of the invention to machine a work piece to circular cross section by rotating the work piece slightly more than one-half rotation while engaged at opposite sides by opposed milling cutters.

It is a further object of the present invention to provide a machine for carrying out the herein described method which is characteristic by novel structural features to impart extreme rigidity thereto.

It is a further object of the present invention to provide an automatic machine for carrying out predetermined cycles as desired.

It is a further object of the present invention to provide a pair of opposed milling cutters in relative fixed relation in combination with a traversing table having two work spindles thereon, one of said spindles being in loading position while said other spindle is in cutting position with relation to the milling cutter.

It is a further object of the present invention to provide a machine in which the work piece is advanced from loading position at high speed and is fed into predetermined cutting engagement with the tool at a feeding speed.

It is a further object of the present invention to machine a work piece to circular cross section by feeding the work piece relative to a rotary cutter interrupting the feed, rotating the work piece, further feeding the work piece and then further rotating the work piece.

Other objects will be apparent as this description proceeds and especially when taken in conjunction with the accompanying drawings, in which Fig. 1 is a front elevation of my improved machine;

Fig. 2 is a rear elevation of the machine;

Fig. 3 is a plan view of the tool heads;

Fig. 4 is a section on the line 4—4 of Fig. 3;

Fig. 5 is a side elevation of the tool heads taken from the right in Fig. 1;

Fig. 6 is an enlarged elevation of the cross slide partly in section;

Fig. 7 is an enlarged view of the transmission shown in Fig. 6;

Fig. 8 is a section on the line 8—8 of Fig. 6;

Fig. 9 is a side elevation of my machine with parts broken away;

Fig. 10 is a wiring diagram showing the circuits for the various control mechanisms:

Fig. 11 is an irregular vertical section through the slide transmission;

Fig. 12 is a section along the line 12—12 of Fig. 11;

Fig. 13 is a section along the line 13—13 of Fig. 11;

Fig. 14 is an end view of the lead screw nut;

Fig. 15 is a section on the line 15—15 of Fig. 14;

Fig. 16 is a section of the support for one end of the lead screw;

Fig. 17 is a plan view of one form of solenoid operated mechanism for actuating the rate selector;

Fig. 18 is a side view of the mechanism shown in Fig. 17 showing the solenoid and the rate selector actuated mechanism;

Fig. 18A is a section on the line 18A—18A of Fig. 17;

Fig. 19 is a modified wiring diagram in which provision is made for two stages of speed;

Figure 34:
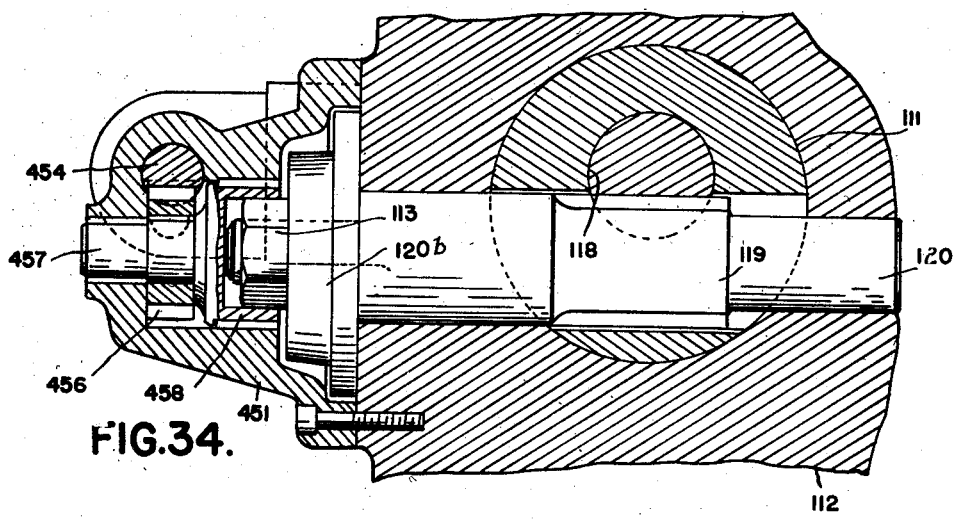
Figure 33:
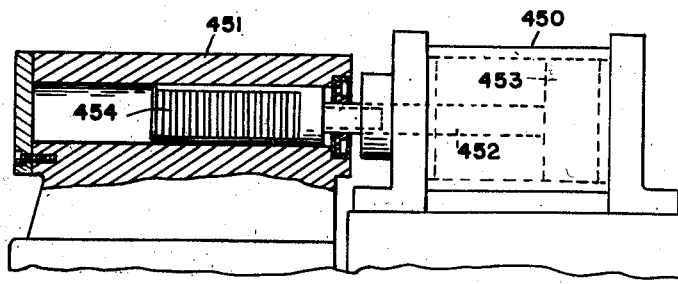
Figure 32:
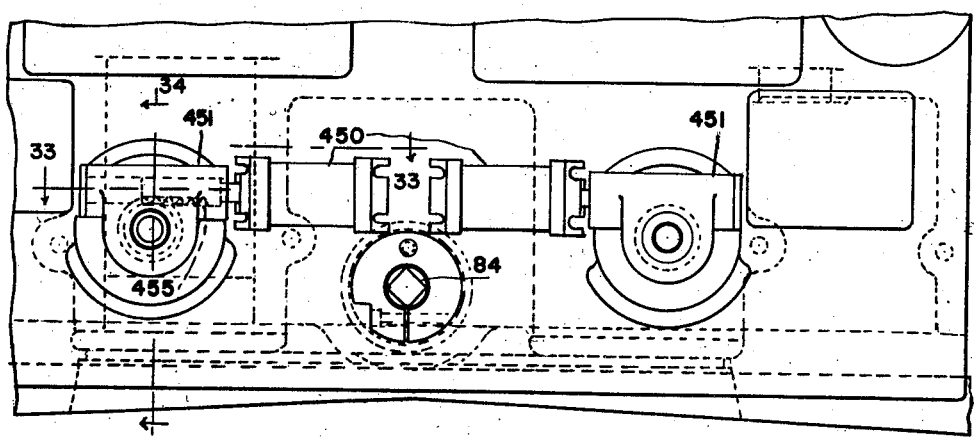
Figure 41:
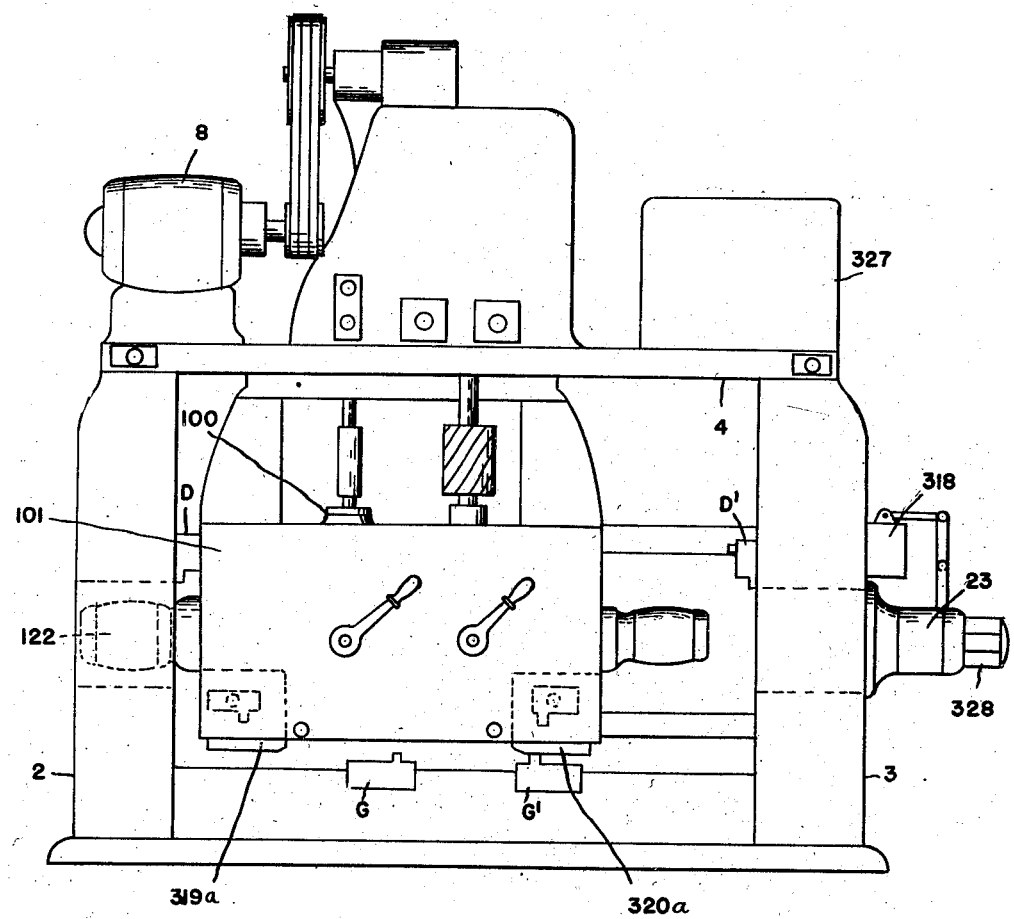

Figs. 20 to 28, inclusive, are diagrams illustrating several methods of feed and traversing cycles that may be employed on the present machine;

Fig. 29 is a diagram showing cyclical operation in which a rotary table is employed;

Fig. 30 is a plan view of one form of rate selector actuator mechanism;

Fig. 31 is a side view of the device shown in Fig. 30;

Fig. 32 shows a motor operated device for vertically reciprocating the work spindles;

Fig. 33 is a section on the line 33—33 of Fig. 32;

Fig. 34 is a section on the line 34—34 of Fig. 32;

Fig. 35 is an enlarged detail elevational view of the work holding mechanism;

Fig. 36 is a side elevational view of the strut for supporting one end of a cutter spindle;

Fig. 37 is a front elevational view of the strut shown in Fig. 36;

Fig. 38 is a top plan view of the strut shown in Fig. 37;

Fig. 39 is a sectional view taken on the line 39—39 of Fig. 37;

Fig. 40 is a section on the line 40—40 of Fig. 1;

Fig. 41 is a diagrammatic front elevation showing the disposition of the various control mechanisms;

Fig. 42 is a diagrammatic showing of a typical cutter assembly.

In order to simplify the disclosure of the machine embodying the present invention, I have divided the description into convenient groups comprising: general organization; details of certain actuating mechanisms, and the like.

GENERAL ORGANIZATION

As well illustrated in Fig. 1, the machine comprises a primary base 1, column-like members 2 and 3 extending upwardly from the base, and a secondary base 4 spanning the columns 2 and 3 and connected thereto at their top as by bolts or other securing means 5. As will be readily understood, columns 2 and 3 may be formed integral with the base 1, or if desired may be separately formed and rigidly attached thereto by any conventional means.

As seen in Fig. 2, a generally flat wall member 1b is provided which rests upon primary base 1 and spans the space between columns 2 and 3. The wall 1b is provided substantially centrally with a pair of openings 1c and an intermediate partition 1a. The openings 1c are for a purpose subsequently to be described.

Cutters 9 and 10 well illustrated in Fig. 9 are carried by the secondary base 4 in generally depending relation thereto and are adapted to be driven from motors 8 operating through suitable speed changer mechanism contained within speed changer housing 7, which in turn is supported from a support 6b. Cutters 9 and 10 are mounted for adjustment toward and away from each other, as will subsequently be described in detail, and are adapted to be rotated at cutting speeds by the motors 8 previously described.

A slide 101 is received between the primary base 1 and the secondary base 4 and is mounted for translation therebetween. This slide is shown in detail in Fig. 6 and is shown in Fig. 1 in its assembled position in the complete machine. It is important that the work be supported with extreme rigidity and for this reason the slide 101 is adapted to engage both the primary base 1 and secondary base 4. For this purpose and as best illustrated in Fig. 6, a housing 81 is provided which is secured to the slide 101 by screws 81a or the like.

Supported within the housing 81 is a supporting roller 80, which is adapted to roll upon a thrust or wear plate 82 provided on the primary base 1, and has wiper elements 87 associated therewith. Journal pin 84 is headed and eccentric to take up wear.

In order to provide for extreme rigidity of the slide or work table 101 during its translation between the primary base 1 and the secondary base 4 a pair of end supports 89 and 90 are extended upwardly from the ends thereof. Connected to the upper end of end supports 89 and 90 is provided a bar 91. As seen in Fig. 9, bar 91 is in sliding engagement with secondary base 4 and for this purpose a wear plate 4a is carried by base 4 against which the bar 91 slides. A pair of work supports are provided comprising head stocks 100 which are movable vertically to clamp and release the work and corresponding tail stocks 92a. Suitable means later to be described are provided for rotating the headstocks 100 in predetermined cycles relative to the other operative movements of the machine. At the rear of the machine, best seen in Fig. 2, is provided a container 76 which receives coolant and chips from apertures 1c previously referred to. The container has a sieve at the bottom to strain out chips and coolant flows therethrough to a reservoir formed in the base 1 of the machine. Motor 73 is operatively connected to a coolant pump 74 which through suitable piping (not shown) is adapted to supply coolant to conventional nozzles located in the vicinity of the cutters, as is well understood in the art.

Slide 101 is adapted to be translated between primary base 1 and secondary base 4 by means of motor 13, seen in Figs. 2 and 9, which operates through the medium of a feed screw 16, as will subsequently be described.

Suitable automatic controls are provided for timing the machine and for causing the various elements to cooperate in a predetermined cycle.

Frame structure

As indicated previously in the description of the general organization the frame of the machine comprises essentially primary base 1, end columns 2 and 3 and secondary base 4.

In addition a strut 49h, seen in Fig. 9, is provided and spans base 1 and secondary base or beam 4 substantially at the mid-portion thereof and at the front of the machine. Strut 49h is preferably a heavy casting and supports the front cutter spindle and rigidly reinforces beam 4.

Coolant is supplied liberally by suitable nozzles (not shown) and the slide 101 is provided with a guard 78a which retains coolant against displacement over the front of the machine. Coolant flows rearwardly down over surface 71, integrally formed with wall 1b to a container 76. Guard or nozzle 77 prevents spilling, and is required by the heavy flow of coolant employed. Chips are carried by the coolant and strained out while the coolant is continuously circulated. Coolant flows from container 76 into reservoir 72, and is recirculated by pump 74 driven by motor 73.

As indicated in Fig. 6, columns 89 and 90 are secured to the ends of the slide 101 and for this purpose, the columns are provided with depending tongue-like extensions 90c. Plates 90d are bolted or otherwise secured to the slide 101 as indicated at 90a and are spaced apart a distance so as to receive the extensions 90c therebetween.

Extensions 90c are further provided with a further tongue and groove connection with the slide 101, as illustrated at 90b.

As best shown in Figs. 6 and 8, the bar 91 is retained in adjusted position on supports 89 and 90 by means now to be described. Bar 91 has transverse recessed grooves 99. Supports 89 and 90 have longitudinal grooves or recesses in which the bar 91 is longitudinally slidable and are also provided with aligned transverse recesses in registry with recesses 99. A tapered wedge 99a is slidable in said transverse grooves and due to its tapered form may adjust bar 91 longitudinally to align the work centers. For this purpose wedge 99a has a depending flange 99b adjustably received within a recess in supports 89 and 90 and a bolt 99c, provided with locking means 99d, adjusts the wedge as described.

The bar 91 reciprocates with the table or slide 101 relative to the secondary base 4. The bar 91 is kept in accurate alignment with wear plate 4a by means of flanges 94 and 95 bolted or otherwise secured to the beam 4. Wear plate 4a is secured to the secondary base 4 in any suitable manner and is preferably provided with means for adjusting the same in order to be able to take up wear between the various parts.

*Cutter transmission and supports*

The drive for the cutters as has been previously alluded to elsewhere in this specification originates in motors 8. Since the machine in the present embodiment is equipped with two identical drives, one for each cutter, only one organization will be set forth in detail.

Each motor 8 is fixed to a base 8a which is pivotally secured to a sub-base member 8b attached to the secondary base 4. Motor supports 8a and the attached motor 8 is pivoted with respect to the member 8b by means of pivot pins 21. A bolt or stud 22 is fixed in the secondary base 4 and extends through an aperture in the motor base 8a at a point remote from the axis of pins 21, as well illustrated in Fig. 9. Nuts 20, 20 are provided on bolts 22 and are adapted to clamp motor support 8a therebetween in adjusted position. By this means the motor is swung about its pivot pintle 21 in a manner to provide a predetermined tension on the drive belt 23.

Motor 8, as seen in Fig. 1 has an armature shaft 24 extending therefrom and carries driving sheave 25 appropriately grooved to receive a driving belt 23 which preferably takes the form of a multiple V belt disposed about the armature shaft 24, and a driven shaft carries sheaves 26 formed to receive driving belt 23. It will be understood that any suitable power transmitting means may be employed, such for example as direct gear drive, chain drive, or the like.

The drive for the cutter spindle 48 is shown in detail in Fig. 4. As seen in this figure, secondary base 4 is provided with an arcuate slot 4c through which the cutter spindle 48 projects, the slot 4c being arcuate in shape to permit adjustment of the spindle, as will be subsequently described. Bracket 6b supports a housing 7 into which driven shaft 27 projects. A bearing support housing 28 is carried by, or integral with housing 7 in which are provided suitably spaced bearings 29 and 30. Bearing 30 is held in position by closure plate 31 secured to the housing plate 28 as by screws 31a, or the like. Closure plate 31 also carries a lubricant retaining element 31b of any suitable type.

The shaft 27 projects within the housing 7 and has secured to its inner end a gear 32 retained thereon by appropriate holding means 33. Carried by the bracket 6b is a shaft 37 transversely arranged to shaft 27 and adapted to be driven thereby. For this purpose shaft 37 carries a gear 36 adapted to mesh and be driven by gear 32, previously described. Shaft 37 is rotatably supported in housing 7 and bracket 6b by bearings 40 and 40a. Gear 36 is removably secured to a hub carried by the shaft 37, as illustrated in Fig. 4.

In addition to the gear 36, shaft 37 also carries a driving gear 41 disposed between the bearings 40 and 40a and adapted to mesh with a second gear 42 which is keyed or otherwise secured to shaft 43. The gear 42 is disposed intermediate bearings 44 and 44a mounted in the housing 7 and the bracket 6b, respectively. Shaft 43 is retained in position by suitable locking means 43a. A cover plate 58 is mounted on housing 7 and provides access to the beveled gears 32 and 36.

The shaft 43 projects from the bracket 6b toward the secondary base 4 and is journalled in a suitable recess in the secondary base 4 and in the housing 36, a bearing being provided as indicated at 45. Retainer 43b is provided for retaining the bearing 45 in position. Shaft 43 is provided with a gear 46 which may be integral therewith, as shown, or may be keyed or otherwise secured thereto, as desired. The gear 46 meshes with a bull gear 47 carried by the cutter spindle 48. The spindle 48 is carried by the housing 36 entirely separate from the housing 7 or the bracket 6b. The reason for this distinct separation will hereinafter be set forth.

Spindle 48 is disposed parallel with shafts 43 and 37 and is journalled in bearings 53 and 54. The cutter spindle 48 is enlarged, as indicated at 51 to compensate for unusual heavy radial thrusts caused by heavy cuts taken by the cutter. A retainer element 52 is provided for retaining the bearings 53 in position. Securing means 55 at the opposite end of the spindle retains bearings 54 in position, and in addition retains the cutter spindle 48 in the position shown. A cover 56 is secured to the housing 36 to provide access to the bearings 54. The gear 47 previously referred to is secured to a tapered portion 48a of the cutter spindle 48 and relative rotation is prevented by a driving key 48b interfitting the shaft 48 and bull gear 47.

Cutter spindle 48 is provided with a splined end 49 projecting below secondary base 4, the splined portion being adapted to receive cutters 9 or 10, which are retained in position by locking means 49b (Fig. 9).

It will be understood, of course, that the cutter heads are arranged in pairs on the secondary base 4 and that cutter spindles 48 and their cutter holding portions 49 are arranged in a plane that extends at right angles to the longitudinal axis of the machine or the line of movement of the cross slide or work support. As a result of this arrangement, the cutters are presented in what is herein termed as opposed relationship. This arrangement permits a rotary work piece to be completed in substantially 180° of rotation if the cutters 9 and 10 are identical or in 360° of rotation if the cutters 9 and 10 are different.

Adjustment of cutter spindles toward and away from each other is provided in order that work pieces of different diameters may be machined. The adjusting movement of the cutter heads and spindles toward and away from each other is provided by mounting the housing 36 for pivotal movement with respect to bracket 6b and housing 7. The housing 36 has a projecting portion 36a extending beneath the offset end of the bracket 6b. The projection 36a is apertured to receive shaft 43 which passes completely therethrough as previously described and is securely engaged within a recess in secondary base 4. Member 59 is received within the uppermost recess within the projection 36a and positions the housing 36 for pivotal movement, and in addition serves as a retainer for bearing 44a. The shaft 43 therefore serves as the pivot about which the housing 36 may be swung in order to accomplish the adjustment referred to. The slot 4c is arcuate in form and formed on a radius whose center is the axis of shaft 43. Since the driving connection to the cutter spindle 48 is from gear 46 carried by shaft 43 and since swinging movement of the cutter spindle housing and associated parts is about same shaft 43, it will be apparent that driving connection between shaft 43 and cutter spindle 48 is retained in all positions of adjustment of the housing 36.

As seen in Figs. 1, 2, 3 and 9, the housings 36 and associated parts are adjusted relatively of each other by means of a worm and rack combination. Housings 36 have a projection 36d to which is fixedly secured a rack element 36e (Fig. 1). Securely attached to the secondary base 4 is a support 36g in which is rotatably mounted a worm gear 35f engaging rack 36e. The worm 36f is carried by a shaft having a squared end 36h for engagement with a wrench or tool. Rotation of the worm 36f, as will be readily apparent, moves housings 36 and associated parts relatively of each other and of the secondary base 4. As will be apparent from Fig. 9, separate adjusting means are provided for each housing 36 and its associated parts.

In order to retain the cutter spindle firmly in adjusted position, suitable locking means are provided which take the form of stud bolts 60 threaded into the secondary base 4 and extending upwardly through arcuate slots 63 provided in flanges integral with the housings 36. Slots 63 are bossed and faced at the upper side as indicated at 62 (Fig. 3). In order to clamp the housing in adjusted position, nuts 61 are provided, by means of which the housings are firmly clamped to secondary base 4. As will be apparent from Fig. 3, arcuate slots 63 are formed on radii about the axis of shaft 43.

Secondary locking means are provided and take the form of a bar member 64 which is secured to one of the heads 36 by means of a screw bolt 68. The bar 64 at its opposite end is provided with a slot 65 through which screw bolt 66 is passed and is threaded into the other head 36 and clampingly engages the bar 64. Both of the cutter heads are appropriately bossed to receive said bar 64 and are appropriately machined so that a firm locking engagement may be obtained. By this arrangement the cutter heads are rigidly locked together and in addition are rigidly locked to the secondary base 4. The structure as so far defined provides a support for the cutter spindles 48 only at their uppermost end. In the present machine in which exceptionally heavy thrusts are encountered, it has been found desirable to provide additional supports for the lowermost ends of the cutter spindles.

Referring specifically to Figs. 2 and 9, the lowermost end 49k of the rear spindle element 49 is shown journalled or supported against lateral distortion by a pair of supports 49e. These supports are disposed upon and arranged on each side of the partition element 1a and are bolted as indicated at 49f to a horizontal flange on partitions 1a. The supports are provided with appropriate slotted apertures through which screws 49f pass and which slots provide for adjustment in strict conformance with the adjustment of the corresponding cutter head. The wall 1b is in the form of a rigid casting and absorbs the lateral thrust of the cutter without distortion.

A different means must be provided for supporting the lower portion of the front cutting spindle, and in the illustrated embodiment this takes the form of a strut 49h (see Figs. 9 and 36 to 39).

The strut 49h is an integral member and is adapted to span and be connected to primary base 1 and secondary base or beam 4. The strut is therefore rigidly supported and imparts additional rigidity to the secondary base 4. Apertures 49i are provided in the strut 49h in which a bracket member 49d is adjustably secured. As best seen in Fig. 39, member 49d is bifurcated, its arms projecting into apertures 49i. The arms are slotted to receive clamping bolts 49j by means of which the bracket 49d may be adjusted in coincidence with the adjustment of the corresponding cutter head. Brackets 49d and 49e have spindle supporting portions such as shown in Fig. 39 at 49l.

It is apparent from the foregoing that the cutter head 36 and the adjustable supports for journalling the free ends of the cutter spindles provide an arrangement whereby there is a substantially complete elimination of all distortion and of vibration which might otherwise originate in the cutter heads.

*Work spindle and actuating mechanism*

The work slide 101, as previously referred to has two identical work spindles, each comprising a headstock indicated generally at 100 and an associated tailstock 92a. Mechanism is provided for raising and lowering the headstock 100 relative to the tailstock in order to clamp work therebetween and to release the work piece when completed. In addition, means are provided for positively rotating the headstock 100 at predetermined speeds.

The headstock and its elevating and rotating driving mechanism is best illustrated in Figs. 6, 7 and 8. The headstock spindle 102 is mounted for vertical or axial reciprocation and for rotation in the slide 101. For this purpose the slide 101 is apertured at 103a and at its lower portion is provided with a centrally apertured housing 112 for the reception of headstock elevating mechanism.

A bearing 103 is provided for the spindle 102 in the aperture 103a. A retainer ring 105 engages bearing 103 and is secured to slide 101 as by bolts 104 or the like. A suitable oil retainer 107 is provided adjacent retainer ring 105.

The lower portion of the headstock spindle 102 is of reduced diameter as indicated at 102a and is supported in suitable bearings 108 within a sleeve 111 which is mounted for vertical reciprocation in the housing 112. A retainer ring 117 is provided for securing bearings 108 in position and in addition a lock nut 110 is engaged with the lower end 102a of the headstock spindle 102. Bearings 108 as illustrated in Fig. 7 are retained within a shoulder portion of sleeve 111.

The sleeve 111 is slidably and guidingly supported within the housing 112. If desired, only the end portions of sleeve 111 need be finished and the intermediate portion may be spaced from housing 112. A wiper ring 116a is preferably provided adjacent the lower end of sleeve 111.

Vertical movement of the headstock spindle is provided as before mentioned. For this purpose a short rack section 118 is provided within the sleeve 111. This rack section may, if desired, be formed integrally therewith but preferably is detachable and is secured thereto by means of a pin 111a or the like.

Sleeve 111 is provided with a transverse aperture 119 which is vertically elongated to provide for vertical reciprocation of sleeve 111 relative to shaft 120. Shaft 120 is mounted for rotation in suitable apertures provided in the housing 112 and has a forwardly extending portion projecting to the front of the machine (Fig. 8), which is suitably formed as indicated at 113 (Fig. 7) to cooperate with a wrench or lever 114.

A flanged element 120b is bolted or otherwise secured to the cross slide 101 and assists in retaining shaft 120 in position. The shaft 120 is associated with a gear 120a which may be attached to the shaft or may be formed as an integral part thereof. Gear 120a is formed and positioned to mesh with the rack section 118. A suitable closure plate 111b is provided to seal the interior of sleeve 111.

As will be apparent from the foregoing, rotation of the shaft 120 by means of lever 114 results in a vertical movement of the sleeve 111 and hence of the headstock spindle 102 which is rigidly supported therein against relative axial movement.

Means are provided for rotating spindle 102 in all positions of vertical adjustment. This rotating means includes a motor 122 which is supported at one end of the cross slide 101 by means of a bracket 123. Bracket 123 is bolted or otherwise secured to the cross slide as indicated at 125 and is formed also to provide a coupling housing 126. The outer end of bracket 123 is centrally apertured to present an annular portion to which the driving motor 122 is attached by bolts 124 or the like. The motor 122 may be of any type, but is preferably a two speed motor.

The motor drive shaft 127 projects within the coupling housing 126 formed in the bracket 123 and is connected to shaft 129 through the medium of suitable coupling means 128. Shaft 129 is mounted in bearings 130, 131. Shaft 129 is provided with a worm 137 which may be integral therewith or formed as a separate member if desired.

As best seen in Fig. 8, a pair of parallel shafts 139 and 144 are provided above shaft 129. These shafts 139 and 144 extend across a recess or housing portion 143 of the slide 101 and are suitably journalled in recesses 146 provided at the rear thereof. The forward end of shafts 139 and 144 extend through apertures 169 in the slide 101 at which point suitable bearings 142 and retainer member 149 are provided. The projecting ends of shafts 139 and 144 are connected by ordinary change gears 157 and 158 which are removably retained on the projecting ends of their respective shafts by securing means 156.

Within the housing 143 previously referred to the shaft 139 is provided with a worm gear 138 which is keyed or otherwise secured to the shaft 139 in position to mesh with and be driven by worm 137. Rotation of shaft 139 from the motor 122 therefore results in rotation of the shaft 144 and the speeds of rotation may be determined by the speed selected for the motor and the ratio of change gears 157, 158.

The shaft 144 substantially intermediate the housing 143 is provided with a worm 147 which is keyed or otherwise rigidly secured thereto. Worm 147 is adapted to mesh with a worm wheel 159 carried by vertically disposed shaft 160. The shaft 160 is journalled at one end within a recess 163 formed within the slide 101 and at its lower end is journalled within an aperture provided in the slide 101. The shaft 160 has a portion projecting through the aperture for a purpose which will subsequently be explained.

Disposed directly beneath the worm wheel 159 and separated therefrom by means of a spacer element 159a which may be in the form of a flange on worm wheel 159 is a wide spur gear 161, keyed or otherwise secured to the shaft 160. Gear 161 by the mechanism previously described is rotated from the motor 122 and is retained against axial displacement.

The head stock spindle 102 is provided with a tapered portion 165 to which is keyed as indicated at 169 a spur bull gear 164. Gear 164 is firmly retained against relative axial displacement by means of a clamping nut 166, which is locked in place by set screw 167.

As will be apparent from the foregoing, headstock spindle 102 may be raised or lowered to clamp or release the work without disengagement from the driving connection of the motor 122. Axial shifting of the spindle 102 results in relative sliding motion between spur gear 161 and gear 164.

Cover plates 153 and 171 are provided, as best seen in Fig. 1, and may be removed to give access to the spindle drive gearing just described.

Elevation of the head stock 100 is adapted to clamp the work piece W in operative position. The specific mechanism by which the work piece will be clamped between the headstock and the tailstock will of course depend in a large part upon the nature and shape of the work piece. However, in order to illustrate a typical set-up, I have shown in Fig. 35 a work piece of the shape indicated at W.

A driving adaptor 100a comprises in the present instance a generally conically shaped body having a flange 100d through which the member 100a is adapted to be clamped to the headstock 100. Registering keyways are provided in the lower surface of the member 100a and in the upper surface of the headstock 100 and are adapted to receive a key 100c for assisting in transmitting rotation.

In the present instance the work piece W is provided with a lower flange portion which has a plurality of apertures 11c therein. Accordingly, the fixture 100a is provided with a corresponding number of pins 100b suitably received in the top of the fixture and locked in place as by means of set screws 100f, or the like. A centering pin 100g is provided which is adapted to be received within a central opening 12 with which the work piece in this instance is provided.

As best seen in Fig. 35, the bar 91 is provided with a vertically extending recess in which is received a sleeve element 92. The tailstock center element 92a is positioned within the sleeve 92 and has adjacent its upper end an aperture adapted to receive a pin 91a. In addition sleeve 92 is provided with an aperture at one side thereof and centering pin 92a is provided with an inclined surface 92b. A set screw, or the like, indicated at 91b is adapted to pass through the aperture in the sleeve and engage inclined surface 92b for retaining pin 92a in assembled position.

As will be seen from this figure, the bar 91 carrying tail center pin 92a, is rigidly supported against side thrust between flanges 94 and 95 and in addition is supported against longitudinal displacement by the rigidity of the entire assembly and particularly due to the association of bar 91 with the beam or secondary base 4.

Certain details of construction such as the means for lubricating the parts have not been described and it will be understood that any suitable lubricating system, such as bath, spray or drip method may be employed.

The foregoing description has been limited to mechanism for rotating and elevating a single headstock spindle. The two headstocks are identical in construction and each is provided with its own driving motor 122 and identical chain of driving gears. Also the elevating mechanism and a separate lever 114 is provided for raising and lowering each headstock.

As thus far described, the mechanism for raising and lowering the headstock 100 is manual, although an automatic or semi-automatic means is contemplated and will subsequently be described.

Power headstock operation

As thus far described, elevation of the headstock is provided by purely manual means. In some cases, however, it is desirable that power operation be substituted. I have illustrated in Figs. 32 to 34 an arrangement by which the headstock 100 may be raised or lowered by power means.

For power operation of the headstock a motor 450 designed to be operated by fluid under pressure is provided. Motor 450 has a piston 453 to which a connecting rod 452 is applied and which extends from the cylinder.

Connecting rod 452 is directly connected to a rack member 454 having teeth 455 formed thereon. Rack member 454 is slidably retained in a suitable bore in housing 451 which is removably secured to slide projection 112 and fits over the nut-like element 113 and flange coupling element 120b. Rotatably mounted in housing 451 is a shaft 457 having a socket element 458 directly connected thereto. Socket element 458 fits over nut-like element 113 and is adapted to rotate the same. The shaft 457 has pinion 456 keyed or otherwise secured thereto. The pinion 456 is adapted to mesh with teeth 455 formed on rack 454.

Fluid under pressure is admitted to either side of the piston 453 and causes translation of rack 454. A suitable manual reversing valve may be supplied to control the admission of fluid under pressure to motor 450 or, if desired, the reversing valve may be automatically controlled by conventional trips. Thus, for example a trip may be provided which will cause headstock spindle 100 to be lowered as it comes to rest in the loading position. If desired, a second trip may be provided for elevating headstock spindle 100 just prior to or immediately upon commencement of its transverse toward the cutters. The combination of manual and automatic controls may be provided which will cause the headstock spindle to be lowered automatically but will require manual manipulation of a control valve to elevate the same.

The operation of mechanism thus far described is believed obvious. Translation of rack member 454, due to operation of motor 450, results in rotation of the socket member 458 and hence of shaft 120. Rotation of shaft 120 through the medium of intermeshing pinion or gear 119 and rack 118 causes the corresponding vertical translation of member 111 and hence of the headstock spindle 100.

Slide transmission

The work support or cross slide 101 supporting the headstock 100 is mounted for translation with respect to the main frame portion at several rates of feed and traverse and is also capable of being manually stopped at selected predetermined positions to inspect the work presented to the cutters. The essential parts of the transmission for accomplishing the foregoing is best seen in Figs. 8, 9 and 11 to 16.

The slide 101 is mounted for translation relative to the frame as seen in Fig. 8, and is partially supported in accurately guided relation by means of an integrally formed gib 20 and a removable adjustable gib 18 cooperating with correspondingly shaped horizontal ways 17 formed as part of the wall structure 1b. Adjustable gib 18 is secured to the slide by a screw means indicated at 19 cooperating with suitable eccentric structure (not shown) well known to the art whereby play or wear may be compensated for as desired.

The slide 101 is provided with a nut or feed assembly 101c which engages a feed screw 16. The feed screw 16 is adapted to be rotated at two distinct speeds in order to accomplish rapid traverse of the slide or feeding motion of the slide as desired. The mechanism for driving feed screw 16 at predetermined rates will now be described in detail.

Motor 13 is secured to one of the column members 2 or 3 (in the present instance column 3) by means of an annular bracket 14 (Fig. 11) secured to a web of the column 3 by suitable securing means, such as the bolts indicated at 14a. The drive shaft 200 of the motor projects into the hollow column 3 where it connects through a flexible coupling 201 with shaft 202. Shaft 202 in turn connects to a pair of trains of driving gears received within the removable gear housing 15, the trains initiating with gears 205 and 209, respectively.

A relatively rapid translation is derived from gear 205, such translation being herein referred to as traverse. A relatively slower feeding translation is derived from gear 209, as will hereinafter appear.

The housing 15 is bolted or otherwise removably secured to column 3, as best seen in Fig. 12. The housing 15 has a forward wall 15a and an intermediate web or wall 15b parallel to the wall 15a. Shaft 202 is journalled in suitable apertures in walls 15a and 15b, antifriction bearings 207 and 207a being provided. Bearing retainer 232 is bolted or otherwise secured as indicated at 204 within the opening in the wall 15a and antifriction bearing 207 is secured within retainer 232. A closure plate 203 is provided and bolts 204 are adapted to simultaneously clamp retainer 232 and cover plate 203 in position.

Intermediate the walls 15a and 15b the shaft 202 is provided with a gear 205 keyed or otherwise secured thereto and retained in properly aligned position by means of spacers intermediate the gear and adjacent bearing members. The end of the shaft 202 remote from the motor projects through wall 15b and the free end of the shaft is provided with a beveled gear 209 keyed or otherwise secured thereto and retained thereon by conventional locking means 210.

Independent trains of driving gears are provided adapted to connect gears 205 and 209, respectively, with a shaft 240. These independent trains of gears will be separately described.

Shaft 239 as seen in Fig. 11 is secured intermediate walls 15a and 15b and carries a bushing 237 thereon. Rotatably mounted on the bushing 237 is a gear combination comprising gears 233 and 234 bolted or otherwise secured together, as indicated at 238. Gear 233 is adapted to mesh with and be driven by gear 205 previously described, and gear 234 meshes with and drivingly engages a gear 235 which is mounted for rotation relative to shaft 240.

Housing 15 is provided with a wall 15e which is apertured to provide for passage of the shaft 240 therethrough. The shaft is mounted in suitable anti-friction bearings 247 and 241 mounted in walls 15e and 15a, respectively. Suitable means are provided for retaining shaft 240 against axial movement and may take the form of an internally projecting annular flange 249b and a corresponding internally projecting annular flange 244a, the latter carried by bearing retainer member 244 bolted or otherwise secured to wall 15a as indicated at 243.

The gear 235 as previously stated is rotatably mounted relative to shaft 240, and for this purpose is retained on bushing 235a. Bearing 235a is retained in position by means of a shoulder on the shaft 240, together with suitable spacing members as will be readily understood.

The other train of driving mechanism starting with gear 209 comprises a bevel gear 211 adapted to be driven by gear 209 and keyed or otherwise secured to shaft 212 (Fig. 12). The shaft 212 in turn is supported in antifriction bearings 213 and 215 mounted in apertures in walls of housing 15. Bevel gear 211 abuts a shoulder on the shaft 212 and is held in position against the shoulder by a suitable spacer 212a. A closure member 214 abuts the outer race of antifriction bearing 213, and retains the parts in assembled position.

The opposite end of shaft 212 projects through wall 15c of the housing 15 and has secured thereto one of a pair of change gears 217, 220. Gear 217 is retained in keyed position on the projecting end of shaft 212 by means of bolt 218, or the like. As indicated in Fig. 12, antifriction bearing 215 is retained in position, the inner race being clamped against a shoulder of the shaft 212 by means of lock nut 212c and the outer race being supported against closure 216 which is bolted or otherwise secured to the aforementioned aperture in the wall 15c.

Supported between the said walls 15c and 15d is a second shaft 223 parallel to and spaced from shaft 212. Shaft 223 is supported in bearings 229, 224 substantially identical to those provided for 212 and which will therefore not be described in detail. Shaft 223 is also provided with an end portion which projects through a suitable aperture in the wall 15c and is adapted to support change gear 220 which meshes with change gear 217. Appropriate means such as bolt 222 is provided for retaining change gear in assembled relation.

In order to conceal the gears and protect the operators a cover 225 is preferably positioned over the change gears. Securing means, indicated at 225a, are provided, preferably of a type which provides for quick removal of the cover plate 225 for inspection and in order to effect substitutions in the change gears.

Intermediate its ends and between the walls 15c and 15d, shaft 223 is provided with a worm 226 which is keyed or otherwise secured thereto in rigid relation. Worm 226 is shown in Figs. 11 and 12 and is adapted to mesh with worm gear 230 which is carried by a holder member 249 rotatably supported upon shaft 240. Suitable bearings 250 and 250a are provided intermediate shaft 240 and holder 249. As shown in Fig. 11, worm gear 230 is bolted to an annular flange projecting outwardly from holder 249, but as will be evident may be formed integral therewith if desired.

As thus far described, motor 13 is adapted to rotate gears 235 and 230, both of which are supported for free rotation on the shaft 240. In order to provide for rotation of the shaft 240 at a predetermined rate a clutch member generally indicated at 252 is provided. For this purpose the shaft 240 is provided with axially extending splines 253 upon which a correspondingly splined member 252 is axially slidable.

The clutch shifting mechanism will subsequently be described in detail and it is sufficient for the present to note that member 252 is provided at each end with clutch teeth 252c. Holder 249 is provided with corresponding clutch teeth 252a which are adapted to engage with teeth 252c. In like manner gear 235 is provided with correspondingly formed clutch teeth 252b which are adapted to engage in clutching relation the corresponding teeth formed on member 252. It will thus be seen that when clutch 252 is shifted to the left, as seen in Fig. 11, rotation of the gear 230 will be transmitted by means of clutch teeth 252a and 252c through the clutch 252 and through the splines 253 to the shaft 240. In like manner when clutch 252 is shifted to the right as seen in this figure, rotation of the gear 235 is transmitted through engaging teeth 252b and 252c through spline 253 to the shaft 240. As will be apparent from the foregoing, shifting of the clutch provides for rotation of the shaft 240 at differential speeds. These speeds may be varied by variation in motor speed, and feeding speed may additionally be varied by change gearing 217, 220 and thus predetermined in accordance with the work piece being machined.

Shaft 240 projects within a portion 15h of the housing 15 and has keyed or otherwise secured thereto a bevel gear 254. In Fig. 11 I have indicated gear 254 as retained on a reduced end of shaft 240 by means of locking nut 255.

Extending the length of the machine and appropriately journalled in columns 2 and 3 is a feed screw shaft 16. As shown in Fig. 13, shaft 16 has a portion 16a extending within housing portion 15h and has keyed or otherwise secured thereto a bevel gear 257 adapted to mesh with and be driven by bevel gear 254. The shaft 16 is rigidly retained against axial displacement by antifriction bearings 258 which are carried in bearing retainer 267 bolted or otherwise rigidly secured in housing 15. The end of shaft 16 is threaded and is provided with a nut 261. As is apparent in Fig. 13, nut 261 retains bevel gear 257 against a shoulder formed on the shaft 16 through the medium of the inner races of bearings 258 and appropriate spacer means. A cap 262 is secured over the projecting end of shaft 16.

As best seen in Fig. 16, the opposite end of shaft 16 is journalled within a bossed portion of bearing retainer 267 which is bolted or otherwise secured to column 2 at the opposite end of the machine to column 3. Bushings 268 are provided and a passage 272 is formed in the bearing retainer for the admission of oil to the bearings 268. Preferably the end of shaft 16 is squared or formed as a hexagon, as indicated at 269, in order that the same may be manually turned with a suitable wrench. A cover 270 is secured over the squared end of shaft 16 and is retained in place by suitable securing means, such for example as bolts 271.

The lower portion of the housing 15 which receives and supports one end of shaft 16 is open and is provided with a closure plate 15f bolted or otherwise secured to the housing 15 by suitable securing means, such for example as bolts or screws 15g.

The intermediate portion of feed screw 16 is threaded as indicated at 16b in Fig. 15 and is adapted to cooperate with a feed assembly 101c which is secured as by bolts 277, or the like, to an intermediate portion of the slide 101.

Feed assembly 101c comprises a member 273 which is centrally apertured to receive a pair of internally threaded nuts 274a and 274b. These nuts are provided with threads adapted to correspond to the threads 16b formed on the feed screw 16. Nuts 274a and 274b are rotatably received within member 273 and are retained in fixed position relative thereto by means of bolts 276 which pass through arcuate slots 276a in flanges formed on the nut members. By this means it is possible to adjust nuts 274a and 274b so as to take up all play in this part of the feeding mechanism, such that the movement of the slide may at all times be positive and certain.

The assembly is best seen in Fig. 9 in which the feed screw 16 is shown engaged by feed assembly 101c which in turn slides in clearance slot 1d of wall 1b.

From the foregoing it will be evident that a flexible translation has been provided for the work table or cross slide 101. The gear box 15 (Fig. 11) is removable from the machine as a unit in order that repairs, adjustments and inspections may be materially facilitated. All gears are run in an oil bath which will insure adequate lubrication and cooling.

Rate selector actuator

As best seen in Figs. 11 and 12, a rate selector actuator takes the form of a clutch member generally indicated at 252 splined for axial displacement relative to shaft 240.

Extending transversely to shaft 240 and spanning walls 15c and 15d of housing 15 is journalled shifter rod 379. A shifter element 393 is keyed and clamped to rod 379 for rotation therewith and has a pair of opposed upwardly extending forked arms 394. Clutch 252 is provided with a circular peripheral groove 383 to receive a split collar 382 (Figs. 11 and 12) in which the clutch rotates. The collar 382 has a pair of diametrically opposed projections 386 and 387 with bushings 390 fitted thereon.

The forked arms 394 of shifter element 393 engage bushings 390 and as will be readily apparent upon rotation of shaft 379 provide for axially shifting clutch element 252c into engagement with gear 230 or 235 as desired.

I have illustrated two different mechanisms for actuating shifter rod 379. In Figs. 30 and 31 solenoid 352 is secured to arm 381 on base 350 as by bolts or the like indicated at 353.

Base 350 has a bracket arm 350a extending therefrom to which is pivoted a pair of plates 359 and 356 as by stud bolt 357 or the like. Plates 359 and 356 are secured together to form a bell crank. Armature 352 has a headed plunger element 353a which is connected by a link 355 with plate 356. Reciprocation of the link 355 as will be apparent results in oscillation of plates 356 and 359 about bolt 357.

Base 350 has a projection 373 formed thereon through which is slidably supported a rod 371. Rod 371 is pivoted to plate 356 as indicated at 360. In addition the rod 371 carries a spring retainer element 370 which serves as a seat for a spring 372. Spring 372 also bears against projection 373 and biases plates 356 and 359 in a clockwise direction. At the opposite end of rod 371 a balancing cushion spring 374 is provided retained between projection 373 and a retainer nut 376.

Shifter rod 379 has keyed and clamped thereto an actuated arm 377. As best seen in Fig. 30, plate 359 is provided with an appropriately formed slot 380 and arm 377 has a roller 385 which rides in slot 380. It will be apparent that as plates 356 and 359 are brought about bolt 357 a corresponding rotation will be transmitted to shifter rod 379 due to the interaction between roller 385 and slot 380.

Upon energization of the solenoid the plunger 353a will be moved to the right thus actuating shifter rod 379 and at the same time storing up energy in spring 372. When the circuit is broken to the solenoid spring 372 returns the parts to the position shown in Fig. 30.

It will be apparent that if desired a pair of solenoids may be employed and spring return mechanism omitted.

In Figs. 17, 18 and 18a I have illustrated a somewhat different embodiment of my rate selector actuator.

The rate selector actuator 379 projects through an aperture in housing 15. A base element 400 is bolted to the housing 15 and is provided with a bracket 402 to which is bolted or otherwise secured a solenoid 405. Centrally mounted and axially movable in the coil 405 is a plunger 403 carrying a removable head 404 and slotted at its other end as indicated in Fig. 18. The lower surface of the base 400 is recessed as indicated at 420 and a substantially flat plate 409 is bolted to the base 400. Plate 409 is bifurcated to provide a central space 406 and the legs 407 are recessed as indicated at 408. By this arrangement when the plate 409 is bolted within the slot 420 in base 400 a recessed slot 410 is provided. This slot is downwardly open at the space 406. The plate 409 adjacent the opening 406 is struck upwardly to provide a central aperture in ear 411 for a purpose subsequently to be described. A plate 412 is slidably mounted within the slot 410 and is adapted to be slidably actuated by solenoid plunger 403. Rod 413 extends through the central aperture of ear 411 and has a coil spring 414 supported thereon and abutting ear 411 and lock nut 415. Spring 414, as will be evident urges rod 413 to the left in Fig. 18. Rod 413 at its end opposite from nut 415 has a block 416 integral therewith or secured thereto. Block 416 is bifurcated and is pivotally connected to armature 403 by a link 417. In addition block 416 is riveted or bolted to plate 412. The rivets and/or bolts pass through the opening 406 previously referred to for this purpose.

Rate selector actuator 379 has a lever 418 rigidly clamped thereto. Lever 418 has a bushed pin 419 projecting therefrom. Plate 412 has an S slot 412A through which pin 419 projects. As will be apparent, reciprocation of armature 403 results in predetermined partial rotation of rate selector actuator rod 379. The straight ends of the slot provide a safety feature, to safeguard against reverse pressures actuating the rate selector. Movement of the armature 403 to the right besides actuating the rate selector actuator rod a predetermined amount also stores up energy in spring 414, which serves to return armature 403 to the left as shown in Fig. 18 upon deenergization of the solenoid.

Trip mechanism for automatic control

As previously mentioned, the work spindle motor is adapted to be started only after the work piece has been brought substantially intermediate the opposed cutters. The circuits for the automatic control will be subsequently described, but at the present time the mechanical structure which brings about the operation of the various circuit control mechanism will be described. The shaft 160, best seen in Fig. 7, is provided at its lower end with a small stub shaft 425a, which is pinned or otherwise secured to the shaft 160 by means indicated at 426. Adjacent the free end of the shaft, keyed or otherwise secured thereto, is a small gear 425. The gear 425 projects with a housing member 431 which is bolted or otherwise secured to portion 429 of the slide 101. A closure plate 432 for the housing 431 is provided and is bolted or otherwise secured thereto as indicated at 433. A shaft 428 is journalled between the upper wall of the housing 431 and the closure plate 432 and has its lower end projecting through the closure plate for a purpose subsequently to be described.

Within the housing the shaft 428 is provided with a gear 427 which is meshed with and adapted to be driven by gear 425. In this figure I have indicated gear 427 as attached to shaft 428 by means of a set screw, or the like, 427a.

It should be noted at this time that the gear ratio between gear 425 and 427 may be the same as that between gear 161 and bull gear 164. This will result in a driven rotation of shaft 428 which will correspond approximately to the rotation of the work spindle shaft 102, after which the spindle may coast. Preferably however the gear ratio is such that driven rotation of the work spindle continues a few degrees beyond a half or a full turn.

The free projecting end of shaft 428 is provided with a cam 326 which is adapted to cooperate with a switch C', as will be further pointed out. By properly correlating the cam surface 326 with the plunger of the switch C' predetermined operation may be obtained.

If desired, and as will be subsequently pointed out in detail, the shaft 428 may be caused to rotate several times before withdrawing the work from the cutters. The changing of gears 425 and 427 in the proper ratio will produce the desired result.

The reciprocating support 101 carries a pair of trip dogs 319a and 320a as indicated in Figs. 6 and 41. These dogs are adapted to actuate switches G and G', respectively, in order to control circuits, which will subsequently be described. The trip dog consists of a broad element 435 adjustably secured to a portion 436 carried by the slide 101. The portion 436 is provided with a T slot, as indicated at 437, and the plate is attached thereto by headed bolts slidable in the T slot. By this arrangement the plate 435 may be adjusted along the T slot and clamped in exactly predetermined position by tightening bolts 434. By this means the point at which the clutch 252 is shifted to feed position is determined by trip dog 319a. The construction of trip 320a is identical with that just described.

Power circuits and controls therefor

The power circuits for the several motors and relays and other control instrumentalities originate in incoming power lines 300 (Fig. 10) which comes from a main line, disconnect switches (not shown) or from a suitable circuit breaker which will break the power circuit should an overload be imposed upon any one of the several motors. The power line 300 terminates in the lower terminals for main switch 301.

The controls for the machine are divided into two parts, one being a low potential relay circuit and the other a commercial or relatively higher potential circuit from which the several motors are actuated. The low potential current is supplied from a transformer 305 connected directly across the incoming power lines 300.

The cutter spindle motors 8, 8 and coolant supply motor 73 are connected directly across the main power lines 302. These motors will operate at all times irrespective of the condition of the work rotating motors 122, 122' and the cross slide motor 13 as long as switch 301 is closed.

When it is desired to set the machine in operation, the work rotating motors 122 and the slide motor 13 are normally at rest. The control circuit is energized by depressing starting switch 303 which closes the circuit through a holding coil 301a of switch 301, thus supplying current to the automatic controls for motors 8, 8 and 23. Closure of switch 303 completes a circuit from the low potential side of transformer 305 through line 306, switch 303, a portion of line 308, switch 304, line 309, holding coil 301a, line 311, line 310 and thus back to the transformer secondary. As soon as the above circuit is completed through switch 303 bar 301b of the main switch 301 closes a holding circuit which includes bar 301b, lines 307 and 306, the transformer secondary, line 310, line 311, holding coil 301a, line 309, switch 304, and line 308 back to the bar 301b. This latter circuit holds the switch 301 in closed position. In the event that it is desired to stop the several motors, switch 304 is opened, thereby opening the holding circuit and permitting switch 301 to open. It is apparent from the foregoing that the admission of power to the several motors is controlled by the operator from station X (Figs. 10 and 41) and that all motors and their control instrumentalities may be supplied with power or stopped by manual manipulation of switches 303, 304.

Starting and stopping circuits have been described in detail. It is believed unnecessary to describe the automatic control circuits with the same degree of particularity, and while the complete wiring diagram is illustrated its description will be as brief as is consonant with a full understanding thereof.

Motors 122 and 122', as previously described, are adapted to drive the work or headstock spindles 100 carried by the work table or slide 101. Motors 122 and 122' are provided with relays 315 and 313 which control the supply of current to motor switches 314 and 312, respectively. Relays 315 and 313 are electrically interlocked in such a manner that motors 122 and 122' will be alternately energized. The purpose of this alternate rotation is to permit chucking or unchucking of the work from one work spindle while the other is rotating.

Slide 101 is driven in translation by a motor 13 which as previously described is of the reversing type and is adapted to quickly reverse its direction of rotation. The control circuit for motor 13 includes a reversing switch 316, the switch 316 being electrically interlocked with switches 312 and 314 in order to selectively determine the operation of motor 122 or 122' in accordance with the direction of translation of slide 101.

The circuit of the machine is organized such that a manual control of the machine is possible whereby the actuation of the slide for each cycle or movement must be initiated by depressing one of the starting switches Y or Y' depending upon at which end of the machine the slide 101 has come to rest. Table actuated switches, later to be described, will stop the table movement at the end of each translation. The foregoing manual control circuit is set up when selector switch Z is moved to hand position as indicated in Fig. 10. When, however, switch Z is moved to the right or to the automatic position, relay 317 is energized and the entire functioning of the machine is then determined from trips C, C', D, D', G, and G'. With switch Z in automatic position the machine may be stopped by opening switch 304 or, if desired, the cross slide and correlated motor spindle may be stopped by opening stop switch S. Selector switch Z is manually shiftable to either of its two positions.

Relays 318 and 319 control the supply of current to relay 317. Relays 318 and 319 are also interlocked with limit switches D and D' which limit the travel of the table to the right or left. They serve as reversing switches when selector switch Z is in its automatic position and when relay 317 is closed the motor 13 is reversed at its limit of travel by trips D and D'.

Relays 320 and 321 and the relays 322 and 323 are interlocked through the medium of limit switches G and G' with solenoid 318a. Solenoid 318a, as previously described, operates rate selector 252 which shifts the slide transmission from traverse to feed. The several relays are capable of functioning independently of reversing switch 316 and the change of rate is effected by dogs 319a or 320a engaging switches G or G'. The rate of movement of table 101 is therefore automatically controlled responsive to its position through switches G and G' which ultimately control the position of rate selector 252.

Since the rotation of the work spindle motors is a function of the feeding cycle in either direction of travel of the table, therefore each of the aforementioned relays is electrically tied in with relays 313 and 315, switches C and C' actuated by dogs 326 and 327 and relays D and D' actuated to control the rotation of the headstock motors. Therefore in its proper sequence assuming travel of table 101 to the right as shown in the diagram, the table will travel at a rapid rate until dog 319 trips switch G. This will energize the proper relays of the group 320, 323 such that solenoid 318a will change to feed position. Continued movement of the table will trip switch D, stopping the table 101. This will be followed by a starting of motor 122' through actuation of relays 313 and switch 312 to machine the work piece carried by the headstock 100 to size.

Movement of the slide 101 in the opposite direction will be accomplished at the completion of headstock movement when trip dog 326 will actuate switch C' to actuate reversing switch 316, shift solenoid 318a to rapid traverse position and simultaneously stop motor 122' and reversely start motor 13 to reverse translation of the slide. In the event movement of the table was initially started in the opposite direction, motor 122 and trip 327 will be in operation, and the corresponding relays and switch will cause a cycle precisely like that previously described.

Relays 324 and 325 are directly interlocked with selector switch Z and limit switches D and D'. When switch Z is in automatic position, reversing switch 316 is actuated by relay switch 318 to reverse the motor as determined by switches D and D'. When selector switch Z is in the hand operation position, the starting of the table movement is entirely dependent upon switches Y and Y' which directly control switch 316 when selector switch Z is in hand position.

Trip switches C and C' are controlled by appropriate dogs 326 and 327 actuated by the headstock spindle transmission as previously described. These switches directly control relays 313 and 315 which in turn determine the starting and stopping of motors 122 and 122' and are interlocked as elsewhere described with switches D and D'.

Slide actuated switches D and D' are dual purpose mechanism in that they serve not only to limit the travel of the slide but also when selector switch Z is in the automatic position they selectively energize switch 316 to reverse the direction of rotation of motor 13. After the completion of the cutting operation as determined by either of the dogs 326 or 327, either of said dogs closes circuits to cause motor 13 to traverse the table away from the cutters. The limit function is intended to prevent the table from over-travel with resulting damage to the machine and to prevent an improper positioning of the work piece relative to the cutters.

A second and more important function of the limit switches is the correct positioning of the work piece relative to the cutters, depending upon the nature of the cut and type of work piece. The axis of the headstock 100 may be directly in line with the axes of the two cutter spindles 48, 48 or it may be stopped just before the plane through the cutter axes is reached. Whatever the position of the stop, this position must be exact and therefore the limit switches are most important to the proper functioning of the machine. Since the slide 101 will be feeding just prior to actuation of switches D or D', and the cutters cutting, the limit switches D and D' will therefore determine the finished or semi-finished diameter of the work piece by determining the precise point at which rotation of motor 122 or 122' will commence and the precise point at which slide 101 will be stopped. In order that stopping of slide 101 may be positive, motor 13 is equipped with a conventional brake 328 which will stop motor 13 substantially instantly as soon as switch D or D' is tripped by the slide 101. Switches D and D' have been indicated in Fig. 41 as adapted to be actuated directly from the slide 101, but it will be apparent that these switches may be positioned elsewhere to be actuated from suitable adjustable projections on the slide 101.

As an alternative, switches D and D' may themselves be adjustably positioned relative to the cooperating portion of slide 101.

Switches G and G' are controlled by dogs 319a and 320a. The essential function of these switches is to actuate solenoid 318a from traverse to feed and vice versa during a cycle of operation. These switches function independently of the reversing switch 316 and are arranged so that on completion of a cutting operation the slide or table travel during withdrawal of a finished work piece from the cutters is at a rapid or traverse rate.

Referring now particularly to Fig. 41, a somewhat diagrammatic front elevation of the machine is shown. Selector switch Z, switch S and master start and stop switch X, switches Y and Y' are all located at an upper level on the machine. Limit switches D and D', as previously described, may be supported on columns 2 and 3 or may be carried by the slide 101 if desired. Dogs C and C' are carried by the headstock spindle transmission. Switches G and G' are carried on the base of the machine to cooperate with dogs 319a and 320a carried by the slide 101. The several relays previously described are conveniently assembled in a suitable control panel box 328. Solenoid 318a is mounted on or adjacent gear housing 15 so as to make a direct connection to rate selector 252.

A series of cyclical operations will be detailed to illustrate the sequential operation of the various control switches, relays, etc. When switch 301 is closed the operator is then enabled to set the headstock 100 and the slide 101, respectively, in motion. Assuming that it is desired to control the cross slide and the corresponding parts by manual operation, selector switch Z is set to hand operation as indicated in the diagram. Then assuming that the cross slide is in its furthest left position, the limit switch D will be depressed. With D depressed, current will now be supplied through the forward side of switch 316. Simultaneously, current will be supplied to motor 122' through switch 312 closed by relays 313 and C'. Motor 122' will continue operation until cam 326 trips relay C' thereby opening the circuit through switch 312 by reversely energizing relay 313. Relay 313 remains energized through relay D' to hold switch 312 in open position.

With the selector switch Z still in hand position, the cross slide is traversed to the right upon closure of switch Y. As soon as Y is released to open position the holding circuit through relay 318 is released, motor 13 will commence to rotate and solenoid 13a will be energized to set rate selector 322 in rapid traverse position. The start of position to the right will release limit switch D finally opening switch 312 by reversely closing relay 313 as previously indicated and therefore stop motor 122'. Switch G' is also released, but for the moment this is immaterial as its turn in the sequence has not yet arrived. Switch G has not thus far been disturbed and has made it possible for relay 320 and therefore relay 322 to be closed upon closure of switch Y. When, however, dog 319a contacts G it will be depressed or opened, relays 320 and 322 will open and solenoid 318a will be deenergized thus returning to a feeding position which will result in slide 101 being fed at a very slow rate.

Feeding movement of the slide continues until the slide depresses limit switch D' at which time the circuit to motor 13 will be interrupted and the motor locked in position by a brake 328. The circuit through the reverse side of reversing switch 316 is broken and the circuit through C and holding coil 314 will be closed, thus starting the right-hand work spindle motor 122 whose work piece has previously been positioned between the cutters. Motor 122 rotates the work piece an amount predetermined by the design or setting of cam 327, at which time switch C is opened, thus breaking the current supply through 314 and through 316 by reversely closing relay 315 by a holding circuit established through D.

To start motion to the left switch Y' is manually closed and an opposite but similar cycle will take place.

Assuming now that the selector switch Z has been adjusted to the automatic position, the sequence of the relay operation is identical with the above. Relay 317 has become energized but it is not affected by the tripping of limit switch D or D'. When switch C trips 315 and is reversely closed current is supplied through 317, G' and 321 to the reverse side of 316, which will start motor 13 and move table 101 to the left. Movement of table 101 to the left takes place at a rapid traverse rate due to the fact that closing of switch 321 closes 323 which supplies current to solenoid 318a, thereby shifting rate selector 252 to rapid traverse position. The remainder of the cycle is identical with the sequence of operation initially described with motion toward the left after the machine cycle has been initiated by closure of switch Y.

As soon as the slide 101 reaches the extreme left position it will cause motor 122' to start and after its cycle of operation is performed dog 326 will cause motor 122' to stop, when D is finally released and start slide 101 to the right at a rapid rate. Trips D and D' will alternately start and stop motors 122 and 122' until stop switch S is depressed.

The circuit outlined herein is limited to single stage feeding. Under certain conditions it is desirable that two or more cuts be taken, or in other words that multiple stage feeding take place. Such a condition arises when the amount of metal to be removed is such that it may seriously overload the cutter and the machine. It is also desirable at times that a light cut be taken on a work piece in order to improve the quality of the surface. It is desirable, therefore, to take the cut in two stages: one a rough cut during which time the bulk of the metal is removed; and lastly taking a light cut. As is well understood, roughing cuts are apt to leave chatter or cutter marks on the work piece, and if a second or lighter cut is taken these marks are removed leaving a high quality finished surface.

In Fig. 19 I have shown a slight modification of the circuit and controls shown in Fig. 10, the changes being such that multiple stage cutting takes place.

The basic parts of the two circuits referred to are identical and to simplify an understanding of the operation the same reference numerals and letters are used in Fig. 19 as in Fig. 10. The function of the same identified parts is not altered in the two stage or multiple stage operation.

A typical cycle employing a circuit illustrated in Fig. 19 will be outlined. Assume the slide 101 to be approaching the right, the table makes contact with trip G' at which time the rate of travel is changed to a feed rate by solenoid 318a. The feeding continues until the table contacts D" whereupon brake 328 is set holding slide 101 at rest and initiating rotation of motor 122. Rotation of this motor continues until cam 327a contacts $C_1$. As soon as $C_1$ is contacted, motor 122 is stopped, brake 328 is released, and motor 13 resumes rotation in the same direction to feed the work further into the cutters. The relay 501 has held reversing switch 316 and solenoid 318a in position and has prevented them from shifting. The second feeding stage continues until table or slide 101 contacts D' whereupon motor 13 is stopped and rotation is again imparted to motor 122. Rotation of motor 122 continues until trip 327 engages C, stopping motor 122, actuating reversing switch 316 to withdraw the work from the cutters to rest. If the selector switch Z has been set in automatic position relay 317 will cause reversing switch 316 to keep motor 313 in operation. The table will move to the left until switch G has been tripped which will change the rate of travel to feed by actuating solenoid 318a. Feeding continues until $D_1$ is tripped. This tripping will stop motor 13, lock it in position and start rotation of motor 122'. Rotation thereof will continue until trip 326a engages C" which releases brake 328, starts motor 13 in the same direction to continue feeding of slide 101. Relay 500 holds reversing switch 316 and solenoid 318a against actuation. Feeding continues until dog 326 trips C' which actuates reversing switch 316 to reverse motor 13 and shifts solenoid 318a to traverse and releases relay 500.

The sequence of operation of the relays for effecting the several rotations of feeds and traverse has been described fully in connection with Fig. 10 and therefore reference should be made thereto for the exact sequence of operation. The selector switch Z sets up the same sequence of operation in the circuit of Fig. 19 as it does in the circuit shown in Fig. 10 and its function, together with function of switches X, Y, Y' and S have not been altered. There has now been described two circuits capable of producing a single stage of feeding or a double stage of feeding by the addition of another set of supplemental controls, such as 500, 501, $D_1$, D", $C_1$ and C". The feeding stages may be multiplied as desired, suitable changes being made in change gears 425, 427.

By holding relays 313 and 315 closed, motors 122 and 122' will rotate continuously in such instances as require a continuously rotating work piece. Continuous rotation of the work piece or multiple or fractional rotation thereof will thus be obtainable by supplying the requisite number of additional switches as suggested above.

At this point attention is directed to the fact that the various motors 8, 73, 122, 122' and 13 may be constant speed or may be dual speed motors. It frequently happens that a slower heavy roughing cut may be desired on a work piece followed by a lighter and materially faster finishing cut. This may be accomplished by varying the rates of rotation of the motor 8 or 122 and 122', or both.

In the case where dual speed or multiple speed motors are provided, this can be effected by the association with the trips already provided of suitable relays to effect the change in motor speed.

Cycles of operation

A number of different cycles may be employed in the machining of the work piece as herein contemplated. I have illustrated in Figs. 20 to 29 several of the preferred cycles or methods. In all these figures the direction of rotation of the tool or tools is indicated by the disposition of the teeth on the cutters.

It is to be noted that in all cases both during infeed of the work and during slow rotation of the work the turning torque of the tools on the work tends to turn the work in the same direction. This is particularly important since it prevents any possible backlash which may be present from interfering with efficient operation.

Since the tools are rotated in the same direction their tendency is to rotate the work in an opposite direction from the rotation of the tools. When the work piece is rotated after it is brought to rest substantially between the cutters its rotation is in the same direction as the rotation of the cutters. Therefore, the engagement between the cutter and the work piece prior to initiation of rotation of the work piece has already taken up any possible backlash in the driving mechanism.

In Fig. 20 I have illustrated a pair of relatively fixed opposed constantly rotating cutters 9 and 10. A work piece W is loaded into a work holder at station A and is then rapid traversed toward the cutters to station B. At this point translation of the cutter is slowed to a relatively slow feeding speed which continues until the work piece reaches position C which in the present instance is midway between cutters 9 and 10. During this initially rapid and subsequently slow feeding translation W is held against rotation. Upon reaching position C feeding of the work piece is arrested and the work piece is given a slow translation. This translation may be 180° or slightly more or 360° or slightly more, as desired. Upon completion of the predetermined rotation of the work piece W its rotation is stopped and the work piece is rapidly traversed back to position A. At position A the finished work piece is removed and a piece to be finished is substituted therefor.

It is ordinarily desirable that the work piece be rigidly retained against rotation until it reaches position C. However, it is not so important that the rotation of the work piece be arrested with precision. In fact it is ordinarily desirable that the work piece continue to rotate slightly as it starts its back traverse to position A. This may be taken care of by properly arranging controls for the work spindle motor or it may result from the work piece continuing to coast after the work rotating motor has been deenergized. At the same time, rotation may if desired be initiated just prior to depth cut, since, due to the tangential feed, the rate of depth cut during the last of the feed motion is very small.

Furthermore, while I have primarily illustrated in Fig. 20 a pair of opposed cutters 9 and 10, it will be appreciated that substantially similar results may be obtained by thus translating the work piece relative to a single cutter. Certain important advantages follow the use of opposed cutters, but other advantages are retained although only a single cutter is employed.

The cycle illustrated in Fig. 21 is similar to that shown in Fig. 20 except that a pair of work holding spindles are provided. Opposed cutters 9 and 10 are provided as before and are constantly rotated. With the parts in the position shown, work piece W' has just reached position C intermediate the cutters. At this time the feeding motion of the slide is arrested and a slow rotation is imparted to W'. While this is taking place the spindle W is idle and stationary and a completed work piece may be removed therefrom and a green work piece placed thereon. Upon completion of rotation of W', as heretofore described, which may be slightly greater than 180° if desired, the slide carrying W and W' is rapidly traversed to the left until spindle W' reaches position D' and spindle W reaches position B. At this time the translation of the slide is slowed to a relatively slow feeding speed which is continued until spindle W' reaches position A' and spindle W reaches position C. Rotation of spindle W' has been discontinued upon or just after leaving position C and the spindle is therefore at rest and idle in position A'. Spindle W meanwhile is held against translation in position C and has a slow predetermined rotation imparted thereto. Upon completion of this rotation the slide carrying spindles W and W' is rapidly traversed to the right until spindle W reaches position D and spindle W' reaches position B'. At this time translation of the slide is slowed to a relatively slow feeding speed which continues until spindle W' again reaches position C and spindle W again reaches position A, thus completing the cycle.

The cycle and method illustrated in Fig. 22 shows a two stage feeding operation. Work is loaded into the work holder or headstock at station A and is then traversed to station B. At station B translation of the work piece is slowed to a feeding rate which is continued until work spindle W reaches position B'. At this point the feeding is interrupted and rotation imparted to cut the work piece to circular section upon a predetermined rotation. After the work piece has been cut to circular section, rotation of the work piece is discontinued and the work piece is again fed toward the cutters, this time to station C. At station C the feeding translation of the work piece is again stopped and rotation is imparted to the work piece. Upon completion of the rotation of the work piece the spindle is rapidly traversed back to position A, rotation of the work piece being stopped just prior to or during the last mentioned traverse.

It will be apparent that the same method may be employed with a machine having a pair of spindles substantially as suggested in the description of Fig. 21. In such case, of course, the work piece will be traversed toward station A but its speed will be reduced to a feeding speed before arrival at station A in order to permit the opposite work piece to be fed slowly into the cutters.

In Fig. 23 I have illustrated a cycle substantially identical with that illustrated in Fig. 22 with the exception that but a single cutter 9 is employed. In this figure the work piece is rapid traversed from position A to position B, fed from position B to position B', rotated at least 360° at position B', fed to position C and rotated at least 360° at position C. The completed work piece may then be rapid traversed back to position A.

The cycle illustrated in Fig. 24 calls for a table arrangement in which each of a pair of cutters 9 and 10 are displaced from the true center of the cross slide or work table and at a distance indicated at d and d' in Fig. 24. These distances may or may not be the same and the determination thereof depends upon the nature of the work piece to be operated upon. One of the cutters 9 for convenience is designated a roughing cutter and cutter 10 is designated as a finishing cutter. Each cutter is positioned with its center displaced at a definitely predetermined distance from the center line of the slide so as to position its cutting edges in a predetermined position with respect thereto.

The work piece is loaded on to a headstock at station A and is then advanced toward the roughing cutter. The work piece may be continuously rotated or its rotation may be initiated as the work piece comes to rest at station C. Preferably the table is advanced at a rapid rate to traverse the work spindle from station A to station B at which time the rate of translation of the table is reduced to a feeding speed. The work piece is then advanced from station B to station C at feeding speed and as above stated its rotation may be initiated at C. Upon completion of rotation of the work piece it is returned toward station A at a rapid traverse. When the work piece has been moved to station A it is removed from the headstock and is transferred to station A' at the opposite end of the table. The slide is fed to the right in order to rapid traverse the partially finished work piece to station B' at which point translation of the table is slowed to a relatively slow feeding speed which is continued until the work piece reaches station C'. At this time the work piece preferably is rotated a full turn or slightly more and is then rapid traversed back toward position A'.

It will be understood that the interval during which the spindle is being rotated while in cutting position provides an opportunity for the cutter spindle to be unloaded and a new work piece substituted thereon.

As a result of this, the machine is capable of high production This is further important due to the fact that in the present type of machine cutting operation is extremely rapid and substantially the full cutting time is required for removal and replacement of work pieces on the idle spindle I have illustrated in Fig. 25 a cycle in which cutters 9 and 10 have their axes displaced in the direction of travel of the work slide The cycle makes available a roughing and a finishing cut without the necessity of removing the work piece from the spindle.

The work piece is loaded on to the headstock at station A and is rapid traversed to station B. The work piece is then fed to station B' at which point rotation is imparted to the work piece for a required number of degrees to complete the cutting operation with roughing cutter 9. Rotation of the work piece is then arrested and it is further fed to station C at which station feeding is again arrested while the work piece is again rotated. After completion of rotation of the work piece it is rapid traversed to an unloading station A'.

If desired a pair of roughing cutters may be employed, preferably on the same side of the slide as the roughing cutter 10 in Fig. 25, and spaced on opposite sides of the finishing cutter 9. With this arrangement of parts, a work piece after it has been finished cut by cutter 9 is traversed past one of the cutters to loading position while a second work spindle is carrying a green work piece into engagement with the other roughing cutter. By this arrangement of parts one work spindle may be unloaded and loaded while in idle position and during the cutting period taken up by cutting the work piece carried by the other work spindle.

The cycle illustrated in Fig. 26 shows the cutters disposed as in Fig. 20. In this method or cycle the work piece is continuously rotated and is advanced at a feeding rate into the cutters from station A to station C at which point they have cut to depth. The work piece is held at station C until a work piece of circular cross section has been produced before it is returned to station A. Should it be desired to traverse the work piece until it enters the cutting zone a rate change may be provided just prior to entry of the work piece into the cutting zone as in the cycles previously described.

It will be apparent of course that the same method may be employed with respect to a single cutter and similarly the features of the methods described in connection with Fig. 26 may also be applied to a double work spindle machine as illustrated in Fig. 21.

The method or cycle illustrated in Fig. 27 involves two pairs of opposed cutters, cutters 9 and 10 serving as roughing cutters and 9' and 10' serving as finishing cutters. A work piece is loaded on to a headstock at station A and is traversed to station B at which time its rate of travel is reduced to a feeding rate. Feeding continues until a work piece reaches station C at which point feeding is stopped and rotating of the work piece is commenced. Rotation of the work piece is continued until a rough cut around the work piece is produced. At this time rotation of the work piece is stopped and the spindle is traversed and fed back to station A. The work piece is now transferred to the headstock at station A' and is traversed to B', fed to station C', at which point translation is stopped and rotation is initiated. This rotation is continued until the work piece is cut to circular section at which time the work spindle is traversed back toward position A'. As described in connection with the cycle illustrated in Fig. 24, it will be appreciated that the interval during which a work spindle is in position C or C' may advantageously be employed for unloading and loading the other spindle at station A' or A, respectively.

The cycle illustrated in Fig. 28 is similar to that shown in Fig. 27 except that a single roughing and a single finishing cutter are employed. The cyclical movements, rotation and rate changes involving stations A, B, C, A', B', C' are duplicated in this cycle. In the cycle shown in Fig. 28 the essential difference will be that the work piece will be rotated slightly more than 360°, while in the cycle illustrated in Fig. 27 the work pieces may be rotated only an amount slightly greater than 180° if cutters 9 and 10 and cutters 9' and 10' have similar profiles.

Attention is directed at this point to the fact that in each of the aforesaid descriptions cycle operation and rotation of slightly more than 180° or 360° is employed. It will be appreciated that the work piece will be cut to circular cross section upon completion of exactly 180° or 360° depending upon whether single or opposed cutters are employed and also whether identical opposed cutters are employed. It is desirable, however, to continue rotation of the work piece slightly more than the absolute minimum in order to prevent cutter marks and also to insure the surface of the work piece being finished at substantially identical conditions throughout its periphery. At the same time attention is directed to the fact that the work piece preferably continues to rotate until it is completely out of contact with the cutter. As previously stated, this is accomplished by permitting the work piece to coast as by interruption of power supplied to its motor, or if desired, by positively continuing its rotation until its back traverse has been initiated. This further tends to prevent the appearance of cutter marks on the work piece.

Preferably where two stage cutting is employed the initial cut will be relatively large and the final cut will be relatively small. This will result in a much finer finish to the work after its final or finish cut. Thus by combining the initial rough cut and a final finishing cut the spindle may obtain the fastest possible rate of metal removal and at the same time obtain the finest finished surface in the minimum of time.

In each of the foregoing cycle operations in which the cutters are displaced from the center line of the work support or the headstock equidistantly a full finishing cut is intended or if a roughing and finishing cut is employed it is not essential to reversely traverse the table or work piece away from the cutter. One mode of continuous unidirectional movement of the cutter is illustrated in Fig. 29. In this figure a circular work table is provided; a set of roughing cutters 9 and 10 are employed in combination with a set of finishing cutters 9' and 10', or, if desired, further sets of cutters may be employed, as for example an intermediate set between those designated roughing and finishing cutters in Fig. 29.

If preferred the cutter set-ups may be identical and spaced further apart so that work spindles may be loaded prior to advancing toward each set of cutters. In the illustrated device, however, I have indicated a loading station A at which finished work pieces may be removed and green work pieces replaced on the work spindles. The circular table is traversed from position or station A to station B at which point the movement is changed to a slow feeding speed which continues until the work pieces reach station C. Station C, it will be appreciated, is the cutting station and corresponds to the loading station for the spindles to be unloaded. At station C spindles which present work pieces between the cutters are rotated for slightly more than one-half or a full revolution and the table is again rapid traversed to bring two additional work pieces to the beginning of the cutting zone or stations B at which point the rotation of the table is slowed to correspond to a slow feeding speed.

It will be apparent that the circular table carrying the work spindles may be employed with the methods particularly set forth in Figs. 20, 22, 23, 24, 25, 26, 27 and 28 with only such rearrangement of structure as will be apparent to those skilled in the art.

In all of the foregoing cycles with the exception of that described in connection with Fig. 26, the essential features are the rapid traverse of the work spindle toward the cutters, the reduction of rapid traverse to a slow feeding speed as the work is fed to predetermined position relative to the cutters and the interruption of translation of the work spindle while the work spindle is rotated.

The machine illustrated herein is adapted to remove metal at a very rapid rate. It is preferred to employ cutters having a pitch in the neighborhood of five-sixteenths to three-eighths of an inch. These cutters are adapted to take a cut of about .005 inch per tooth and it has been found that satisfactory operation results at a cutting speed of 100 feet per minute and above. It would of course be possible to employ a greater cut per tooth if a coarser pitched cutter were employed. With the cutter referred to, however very rapid removal of metal takes place and this without substantial heating. It has been found that the work piece immediately upon completion is substantially cool, and the chips themselves are not substantially discolored from heating. This may be explained by the fact that the tool is engaged or buried in the work for only a very short distance and is then rotated through the air for substantially a complete revolution.

It has been found that greatly improved results are obtained when the cutters are properly balanced on each side of the work. A number of considerations are involved in the design of cutters. In many cases there are a plurality of different surfaces of revolution to be finished. Some of these may be circumferences, some may be radial surfaces, and some may be inclined at an angle to the axis of the work piece. It is generally desirable that the work done by the cutter assemblies at each side of the work piece be substantially equal. Another consideration which should be kept in mind is that the lateral thrusts should be balanced and also the torques which tend to bend the work piece or to cause a side thrust on the cutter spindle should be balanced.

I have illustrated in Fig. 42 a typical set-up in which cutter assemblies $C_a$ and $C_b$ are employed to finish surfaces $S_1$, $S_2$, $S_3$, $S_4$ and $S_5$, cutter sections $C_1$, $C_2$, $C_3$, $C_4$, and $C_5$ being employed, respectively, for said surfaces. It will be noted in the figure that the cutter assembly $C_a$ and the cutter assembly $C_b$ are each adapted to do substantially the same amount of work. At this same time it will be noticed that the cutters are so arranged that the bending moments on the work piece are substantially balanced. Normally, of course, the cutter assemblies are dictated to a considerable extent by the nature of the work piece, but in designing the cutter set-ups, it must be borne in mind that no substantially unbalanced cutter thrust should result.

In the case of a relatively long work piece of uniform diameter it will be possible to employ cutters which extend along and cut the entire length of the work piece. In many cases, however, it is preferable to break the cutter up into relatively short sections and provide overlapping cuts from opposite sides of the work piece.

In cases where it is impossible to substantially balance thrust pressures of the cutter on the work it will be found desirable in many cases to design cutter assemblies such that each assembly cuts substantially adjacent both ends of the work piece, even though this involves providing a pair of cutters at opposite sides of the work for the same surface of the work piece.

The foregoing detailed description has been given for clearness and understanding only, and no unnecessary limitation should be understood therefrom, but the appended claims should be construed as broadly as permissible in view of the prior art.

What I claim as my invention is:

1. In a milling machine in combination, a base, a pair of closely spaced tool supports disposed above and carried by said base, a work table reciprocably mounted on said base and in operative relation to said tool supports, means to support a piece of work on said work table including means to rotate said work piece, means to steady the free end of the work piece including a bar member disposed above and parallel to said table, means carried by said table for supporting said bar member, said bar member adapted to pass between said tool supports, and means carried by the work table for axially moving said means to support a work piece whereby said work piece may be brought into engagement with the means to steady the free end of said work piece, and means to relatively reciprocate said work table and tool supports selectively at feed and traverse rates whereby said work piece and cutters may be moved relatively of each other.

2. In a milling machine in combination, a base, a pair of column-like members mounted on said base and supporting a secondary base, a work supporting table reciprocably mounted on said base, cutter spindles supported on said secondary base and capable of adjustment toward and away from each other, a work holder rotatably mounted on said work table, means mounted above said table to assist in maintaining said work piece in position including a bar member disposed above and supported parallel to said table, means to rotate said cutters, and transmission means to feed said work into said cutters, trip means operable to control said feed means and to control the rotation of the rigidly held work disposed in said work holder, said bar member adapted to pass between said cutter spindles.

3. In a milling machine having a base, a pair of tool spindles supported on and above said base; cutters mounted on said tool spindles; means to adjust said tool spindles relatively of each other; a work table reciprocably mounted on said base; means on said table for supporting a work piece at its two ends, said means comprising a horizontal bar parallel to and supported above the table, said horizontal bar passing between said tool spindles as said support is reciprocated to present said work to said cutters, and means mounted in said work table to support the other end of said work piece; said bar and said last mentioned means holding the work firmly as it is presented to the cutters.

4. In a machine tool, in combination, a primary base member, a secondary base member, means mounted on said primary base and rigidly supporting said secondary base above said primary base and in parallel relation thereto, a work table reciprocably carried by said primary base, a pair of tool heads carried by said secondary base and capable of adjustment relatively of each other, said work table and said tool heads being in operative disposition relative to each other, a work holding means carried by said table including a bar member spaced from and parallel to said table, said holding means comprising a plurality of selectively rotatable headstocks, a plurality of tailstocks carried by said work holding means in operative relation to said headstocks, said tailstocks being mounted in a bar member disposed in parallel relation to said table, means mounted on the ends of said table for supporting said bar in said parallel relation, means carried by said secondary base whereby said bar is guided between said tool heads as said table and bar reciprocate relatively of said tool heads, said bar element bearing directly against said secondary base, and thereby providing a rigid work support.

5. In a machine tool, a primary base member, a table mounted on and reciprocable on said primary base, said base being provided with ways on which said table reciprocates, means to rigidly hold a work piece on said table, said means comprising a secondary base mounted in parallel relation to said table and primary base, a tool head carried by said secondary base and operatively disposed with respect to said table, a bar means bearing against said secondary base slidable relatively thereto and carried by said table, means carried by said table for supporting said bar against said secondary base, said bar being movable adjacent said tool head, headstock and tailstock means carried by said table and bar respectively for holding a work piece for presentation to cutters carried by said tool head, and roller means carried at the lower side of the table and bearing on said primary base, and said bar and its supports and said roller and said primary base absorbing cutter thrusts imposed on said work table by said cutters as a work piece is presented to the cutters to hold the work piece firmly.

6. In a means to hold a work piece undergoing circular milling with a minimum of vibration, the combination, a frame having a primary and secondary base, a work support reciprocally mounted on said frame, said work support including a table and a bar member carried by said table bearing against said secondary base, means to support said bar in spaced relation to said table, and roller means mounted on said table and engaging said primary base, said bar member and said roller holding a work piece carried by said work support and said bar firmly.

7. In a milling machine, in combination, a frame comprising a primary and a secondary base element, means carried by said primary base for holding said secondary base in spaced relation thereto, a work table reciprocably mounted on said frame, a plurality of adjustable tool supports carried by said secondary base including spindle means disposed in operative relation to said table, means carried by said table for holding the table firmly, including a roller member carried thereby engaging said frame, and a bar member operatively engaging said secondary base, and means carried by said table for rigidly mounting said bar on said table, and in said operative engaging relation with said secondary base, said bar extending between and adjacent the plurality of tool spindles.

8. In a machine tool, a base, a work table reciprocably supported on said base, a secondary base disposed in spaced relation to said base, means extending between said base and secondary base to maintain said spaced relation, work supporting means carried by said table, said means comprising a bar member in operative engagement with said secondary base, means carried by said table to rigidly support said bar on said table and in said operative engagement, headstock means carried by said table adapted to hold one end of a piece of work, tailstock means carried by said bar to support the opposite end of the work piece, and means mounting said headstock for axial reciprocation whereby said work piece may be engaged with said tailstock.

9. In a machine tool, a base, a work table reciprocably supported on said base, a secondary base disposed in spaced relation to said base, means extending between said base and secondary base to maintain said spaced relation, work supporting means carried by said table, said means comprising a bar member in operative engagement with said secondary base, means carried by said table to rigidly support said bar on said table and in said operative engagement, headstock means carried by said table adapted to hold one end of a piece of work, tailstock means carried by said bar to support the opposite end of the work piece, and means mounting said headstock for axial reciprocation whereby said work piece may be engaged with said tailstock, and power operated means to axially reciprocate said headstock, said power means being controllable by the reciprocable work support.

10. In a machine tool, in combination, a frame, having a primary base and secondary base, means extending between said bases whereby they are maintained in a spaced apart parallel relationship, a work support movably mounted on said primary base, means for selectively moving said work support at feed or traverse rates, said work support including a series of axially movable headstock spindles, said work support also including a series of tailstocks, means slidably engaged with said secondary base for mounting said tail stocks in said work support, power operated means for moving said headstock spindle whereby a work piece carried thereby will engage a tailstock, means controlled by said moving means for the work support for controlling said power operated means.

11. In a machine of the class described, a frame including a base and a secondary base parallel to and spaced from said base, a tool support on said frame, a work carriage slidably mounted on said base, work supporting means on said carriage, said means including a part engaging said secondary base during sliding of said carriage.

12. In a machine of the class described, a frame including a base and a secondary base parallel to and spaced from said base, a tool support on said frame, a work carriage movably mounted on said base, said carriage comprising a part movable on said base, and a spaced steadying part movable on said secondary base, and means for supporting a work piece between said parts.

13. In a machine of the class described, a frame including a base and a secondary base parallel to and spaced from said base, a pair of spaced tool supports on said frame, a work carriage slidably mounted on said base, a bar carried by said work carriage, said secondary base and bar provided with cooperating slidably related surfaces, and work spindles adapted to support a work piece between said carriage and said bar.

14. In a machine of the class described, a frame comprising essentially a base, side columns, and a beam engaging said side columns; a work carriage comprising essentially a table reciprocably mounted in said base, side pillars, and a bar connecting said pillars, and spaced from said table; said bar and said beam cooperating to steady the work carriage, means for supporting a work piece between said table and bar, and a tool support carried by said frame.

15. In a machine of the class described, a frame comprising essentially a base, side columns, and a secondary base mounted on said columns; a work carriage comprising essentially a table reciprocably mounted in said base, side pillars, and a bar connecting said pillars, and spaced from said table; said bar and said secondary base cooperating to steady the work carriage, means for supporting a work piece between said table and bar, and spaced tool supports carried by said frame at opposite sides of said bar.

16. In a machine of the class described, a frame comprising essentially a base, side columns, and a secondary base supported by said columns; a work carriage comprising essentially a table reciprocably mounted in said base, side pillars, and a bar connecting said pillars, and spaced from said table; said bar and said secondary base cooperating to steady the work carriage, means for supporting a work piece between said table and bar, and spaced tool supports carried by said secondary base at opposite sides of said bar.

17. In a machine of the class described, a frame comprising essentially a base, side columns, and a secondary base; a work carriage comprising essentially a table reciprocably mounted in said base, side pillars, and a bar connecting said pillars, and spaced from said table; said bar and said secondary base cooperating to steady the work carriage, means for supporting a work piece by said table and bar, and spaced cutter spindle supports carried by said secondary base at opposite sides of said bar, and means spanning said base and said secondary base for supporting the other end of said cutter spindles.

18. A device for machining a work piece to circular cross section comprising an elongated frame having a flat base and a secondary base spaced from and parallel to said base; a carriage reciprocably mounted on said frame, said carriage having a table slidable on said base and a bar spaced from said table slidable in steadying relation on said secondary base, a tool spindle and a work spindle on said device, one of said spindles being carried by said frame, and the other by said carriage, means for translating said carriage at variable speeds, means for constantly rotating said tool spindle, means for rotating said work spindle, control means for initiating rapid translation of said carriage in a direction to cause said spindles to approach, control means responsive to translation to reduce the rate of translation to a feeding speed, other control means responsive to further translation to arrest said translation, and to initiate rotation of said work spindle, and control means responsive to rotation of said work spindle to interrupt said rotation after a minimum of 180° rotation.

19. A device for machining a work piece to circular cross section comprising an elongated frame having a flat base and a secondary base spaced from and parallel to said base; a carriage reciprocably mounted on said frame, said carriage having a table slidable on said base and a bar spaced from said table slidable in steadying relation on said secondary base, a tool spindle and a work spindle on said device, one of said spindles being carried by said frame, and the other by said carriage, means for translating said carriage at variable speeds, means for constantly rotating said tool spindle, means for rotating said work spindle, control means for initiating rapid translation of said carriage in a direction to cause said spindles to approach, control means responsive to translation to reduce the rate of translation to a feeding speed, other control means responsive to further translation to arrest said translation, and to initiate rotation of said work spindle, and control means responsive to rotation of said work spindle to interrupt said rotation after a minimum of 180° rotation, and to initiate rapid translation of said carriage in a direction to separate said spindles.

20. A machine tool having in combination a frame which includes a primary base and a secondary base, and means carried by said primary base for maintaining said secondary base in a spaced parallel relation to the said primary base, a work table mounted for relative movement with said primary base, said table having pillars mounted thereon, a bar carried by said pillars, said bar being in sliding operative engagement with said secondary base, tool supports mounted on said secondary base and having their cutter spindles disposed on opposite sides of said bar and in operative relation to the work table, and means carried by said frame for supporting both ends of said cutter spindles, whereby said spindles are maintained in true alignment with their respective supports.

21. In a milling machine, the combination, a frame which includes a primary base and a secondary base, means disposed between said bases for maintaining them in a spaced parallel relationship, a work table mounted for relative movement on said primary base, a plurality of adjustable tool supports mounted on said frame, work holding means carried by said table, said means including a plurality of table supported headstocks and a plurality of tailstocks, and bar means supported by said table for carrying said tailstocks, said bar being slidably engaged with said secondary base, said table having a roller means engaging said primary base and maintaining said table rigid, said tool supports each mounting one end of a cutter support, means carried by said frame for supporting the other end of the said cutter support, and said last mentioned means, said bar, and said roller inhibiting vibration of said frame, said table, and said tool supports.

22. In a milling machine, a frame having a primary and a secondary base, means disposed between said bases for maintaining them in a rigid spaced parallel relationship, a work slide reciprocably mounted on said primary base, a pair of tool supports adjustably carried by said secondary base, and rotatably supporting one end of the associated cutter spindles, means for supporting a plurality of work pieces carried by said slide, including a plurality of rotatably mounted headstocks in said slide, and a plurality of tailstocks, and bar means mounting said tailstocks, means on said slide for mounting said bar away from and parallel to said slide, said bar being slidably engaged with said secondary base, means on said slide for preventing a bending of the slide, including roller means which engages a wear plate carried by said primary base, said bar arranged between said cutter spindles and said spindles being operatively associated to said slide, means for journalling the other end of said cutter spindles, said means spanning said secondary and primary bases, and said last mentioned means, said bar and said roller, maintaining said milling machine and work piece with a minimum of vibration during operation.

23. In a machine tool having a work spindle and a cutter spindle, a frame comprising a base, a beam parallel to and spaced from said base, and a bracing member spanning said base and beam, a spindle supported at one end by said beam and at the other end from said bracing member, a slide movable on said frame, and a spindle carried by said slide movable into juxtaposition to said first mentioned spindle.

24. In a machine tool for supporting a tool element and a work element, a frame having ways therein, and spaced parallel guides at laterally opposite sides of said ways; a carriage slidable in said ways and having rigidly spaced portions engaging said guides, and means carried by both of said portions for supporting one of said elements for rotation.

25. In a machine tool, a base member, tool supporting members carried thereby including spindles for supporting cutters, means for driving said spindles, means for adjusting said spindles relatively of each other, a work table reciprocably mounted on said base and in operative relation to said cutters, means carried by said table adapted to rotate a work piece carried by said table, transmission means adapted to rapid traverse and feed said work piece relatively of said cutters, means to start slowly rotating said work piece when the cutters have cut to depth, means for stopping said rotating movement when said work piece has been cut to size, control means actuable for initiating traversing movement of said work piece away from said cutters, said control means and said means for stopping the rotation of the work piece being interlocked such that the traversing motion begins when said rotating movement stops.

26. In a milling machine having a tool support and a work support capable of relative traverse and feed movements, means to provide said relative movements, control means operable by said relatively movable supports to selectively apply said feed movements to said relatively movable supports, means carried by said relatively movable work support and adapted to rotate a work piece held thereby, control means actuable by said relative feed movement to start rotating said work piece and stop said relative feed movement, and control means actuable by said rotatable work support adapted to stop work support rotation and to relatively traverse said work piece and said tool support.

27. In a machine tool in combination, a work support, a tool support, transmission means for moving said supports relatively of each other including means to rapid traverse and to feed said relatively movable supports, means carried by said work support adapted to rotate a work piece carried thereby, means automatically operable whereby as a work piece carried by said work support enters the cutting zone of the tool support said feed transmission will be applied to said relatively movable supports, means automatically operable to interrupt said relative motion and substantially simultaneously to start rotating said means to rotate said work piece to cut same to circular section, and means operable by said rotatable work support at the completion of the work piece rotation to relatively traverse said work support and said tool supports.

28. In a machine having a work support and a tool support, said supports being relatively movable, feed and traverse transmission means for said relative movement, means to rotate a work piece carried by the work support, means to rotate said tool support, means to initiate said traverse, means to terminate said traverse and initiate said feed motion as the work support enters the cutting zone of the tools, means to terminate said feed motion and to start slowly rotating said work support when the relative movement is brought to rest, means actuable by said rotating support for arresting rotation thereof, and means actuable by said last mentioned means to initiate traverse motion after the work piece has been cut to the desired cross section.

29. A machine tool in combination, a work support, and a tool support carried thereby, transmission means to move said work support and said tool support relatively of each other, including means to selectively rapid traverse and to feed said supports relatively of each other, and means to selectively reverse said feed and traverse movements, means to rotate said work support, means actuable by the relative movement of said relatively movable supports to initiate said feed movements, means actuable by said relative movement whereby rotation is imparted to said rotatable work support, including means to stop the relative movement of said supports, and means operable from said rotating work support to initiate a rapid traverse movement in said transmission and to stop said work support rotation after said traverse motion has been initiated.

30. A machine tool for producing circular work pieces, in combination, a primary base structure, a secondary base structure, a pair of laterally adjustable tool supports having cutters thereon and carried by one of said structures to position said cutters between said structures, means for connecting said structures, a work table reciprocable on one of said structures and adjacent said cutters, means for reversely reciprocating said work table relatively of said tool supports, means carried by said work table for selectively rotating a piece of work, said transmission means including means to feed said table toward said cutters, trip control means operable by said table to initiate rotation of said work whereby a roughing cut is imposed on the work piece to cut same to circular section, means operable by said rotating work holder to stop its rotation and to cause said table to continue feeding toward said cutters substantially upon cessation of the work piece rotation to cause said cutters to cut to depth, and additional means operable by said table to again initiate a rotating movement to said work piece after said depth cut to finish cut said work piece to size and means operable by said rotating work supporting means to stop same and to reversely traverse said table and said work piece away from said tools.

31. In a milling machine for producing circular work pieces, the combination, a frame, cutters carried thereby, a work table reciprocable on said frame in operative relation to said cutters, a rotatable work holding means carried by said support, means to reciprocate said table including feed and traverse means, means to rotate said work piece, means operable by said table to initiate rotation to said work holder and to stop said table feed after said cutters have cut to a predetermined depth to rough cut said work piece to circular section, trip means operable by said rotatable work holder to terminate rotation and resume said feed to continue said feeding of said work into said cutters until said cutters have cut to depth, a second trip means operable by said work table to stop the feeding of the table and to again initiate rotation to said work piece to finish cut said work piece to circular section and a second means operable by said work holder to traverse said work piece away from said cutters and to stop the rotation of said work piece.

32. A milling machine adapted to machine work pieces to circular section, the combination, a frame, a series of cutters on said frame, a work table on said frame and disposed in operative relationship to said cutters, means to rotate a work piece carried by said table, transmission means for said table to move same relative to the cutters, said transmission means including a feed and a traverse rate selector means, means by which said feed and traverse rate selector may be selectively applied to said transmission, trip means operable by said work table whereby said selector means is actuated, means operated by said table whereby rotation is imparted to said work holder and said table is brought to rest, and trip means operable by said work holder whereby said transmission traverses the table and work piece away from said cutters and including means to arrest rotation of said work piece.

33. In a machine tool, the combination, a base, a work support, a tool support, said supports being mounted on said base, reversible transmission means to reciprocate said work support relatively to said tool support, including means to feed and traverse said work support selectively, rate selector means therefor and means to selectively reverse said transmission at either feed or traverse rates, a plurality of rotatable work holders carried by said work support including individual means to rotate said work holders, said transmission means and each of said work holder rotating means being interlocked such that when the feed motion is stopped one of said work holders will commence to rotate and when said work holder has completed its rotating movement said selector actuating means will cause the table to be reversely traversed away from said cutters and substantially simultaneously the rotation of said work holder arrested.

34. In a machine tool the combination: a base, a work holder, a tool support, each of said supports being carried by said base, a reversible transmission to reciprocate said supports relatively of each other, said transmission including feed and traverse means and selector means to selectively apply said feed and traverse means to said transmission, a plurality of work supports carried by said table, means to selectively rotate said work supports, said transmission and said means to rotate said work support, trip means adapted to shift said selector to feed position, other trip means actuable to arrest said feed and initiate rotation to said work holder, and trip means governable by said rotating work holder to stop rotation thereof and to substantially simultaneously reversely traverse said work table from said cutters, said means including means to reversely supply power to said transmission.

35. A method of machining a work piece to a desired cross section which comprises, rapid traversing a work piece in straight line relation toward a continuously rotating cutter in a direction such that the periphery of the work piece moves substantially tangentially to the cutter, then feeding said work piece without rotation into the cutter to enable the cutter to cut to depth, then slowly rotating said work piece to machine same to a desired cross section, and then rapid traversing said work piece away from said cutter.

36. A method of circular milling which includes rapid traversing a non-rotating work piece toward a pair of laterally displaced constantly rotating cutters, then feeding said work piece into said cutters in straight line relation until the axes of the work piece and cutters lie in the same plane and arresting said feeding of the work piece, then rotating said work piece to finish cut said work piece and then rapid traversing said work piece away from the cutter.

37. A method of machining a work piece to a desired cross section with a rotary cutter which comprises: relatively feeding said work piece and cutter in straight line relation and in a direction such that the work piece moves substantially tangentially of the cutter while holding said work piece against rotation and rotating said cutter until said cutter has cut to depth; interrupting said relative feed, while continuing rotation of said cutter; and rotating said work piece at least one revolution.

38. A method of machining a work piece to a circular section with a rotary cutter which comprises: relatively feeding said work piece and cutter in straight line relation and in a direction such that the work piece moves substantially tangentially of the cutter while holding said work piece against rotation and rotating said cutter until said cutter has cut to depth; interrupting said relative feed, while continuing rotation of said cutter; and rotating said work piece at feeding speed at least one revolution.

39. A method of machining a work piece to a predetermined cross section with a rotary cutter which comprises: relatively feeding said work piece and cutter in straight line relation and in a direction such that the work piece moves substantially tangentially of the cutter while holding said work piece against rotation and rotating said cutter until said cutter has cut to depth; interrupting said relative feed, while continuing rotation of said cutter; rotating said work piece at least one revolution, and finally interrupting rotation of said work piece and rapidly separating said work piece and cutter.

40. A method of machining a circular work piece with a pair of opposed rotary cutters which comprises: rotating said cutters continuously; feeding a work piece in straight line rotation without rotation between said cutters to depth; interrupting feeding of said work piece; and rotating said work piece at least half a revolution.

41. A method of machining a circular work piece with a pair of opposed rotary cutters which comprises: rotating said cutters continuously; feeding a work piece in straight line relation without rotation between said cutters to depth; interrupting feeding of said work piece; and rotating said work piece at feeding speed at least half a revolution.

42. A method of machining a circular work piece with a pair of opposed rotary cutters which comprises: rotating said cutters continuously; feeding a work piece in straight line relation without rotation between said cutters to depth; interrupting feeding of said work piece, rotating said work piece at least half a revolution and rapidly withdrawing said work piece from said cutters and interrupting rotation of said work piece.

43. A method of machining a circular work piece with a rotary cutter which comprises: continuously rotating said cutter; relatively feeding said work piece and cutter without rotation of said work piece until said cutter has cut to a predetermined depth; interrupting relative feeding and rotating said work piece at least 180°; stopping rotation of said work piece, resuming said relative feed until said cutter has cut to a second predetermined depth; again interrupting said relative feeding and rotating said work piece at least 180°.

44. A method of machining a work piece to a desired cross section which comprises traversing a non-rotating work piece toward a rotating cutter, then feeding said work piece into said cutter, then starting to rotate the work piece just prior to depth cut, then arresting said feed when the cutter has cut to depth, then continuing rotating the work piece to permit the cutter to cut it to desired cross section, then traversing said work piece away from the cutter, and arresting rotation of said work piece.

45. In a method of machining a work piece to circular section, which includes, traversing a work piece toward a cutting zone, then feeding the work piece into the cutting zone, then rotating said work piece to cut to circular section and stopping the rotating movement, then continuing said feeding until the cutter has cut to depth, then again rotating the work piece until the cutter has cut the work piece to a circular section and then reversely traversing said work piece away from said cutting zone.

46. In a method of machining a work piece to a circular section which includes, traversing a non-rotating work piece toward a revolving cutter, then feeding said work piece into the cutter a predetermined distance, then arresting the feeding of the work piece, then rotating said work piece to machine said work piece to a circular section, then continuing to feed said work piece toward the cutter until the cutter has cut to depth, then again rotating said work piece to finish cut the work piece to circular section and reversely traversing said work piece away from said cutter.

47. In the method of machining a work piece to a circular section which includes feeding a non-rotating work piece between a pair of cutters a predetermined distance, arresting the feeding of the work piece, then rotating said work piece to rough cut said work piece to circular section, then arresting said work piece rotation, then continuing feeding the non-rotating work piece into the pair of cutters to depth cut, then again rotating said work piece to finish cut said work piece to circular section and then traversing said work piece away from said cutter.

48. A machine of the type described, comprising opposed cutter assemblies adapted to simultaneously cut a work piece having a plurality of dissimilar surfaces of revolution, said cutter assemblies having different cutter portions together adapted to engage all of said surfaces of revolution, said cutter portions being divided between said opposed assemblies and arranged such that each assembly exerts substantially the same lateral thrust on said work piece, and the torque effects of all said cutter portions are substantially balanced.

49. A machine of the type described, comprising opposed cutter assemblies adapted to simultaneously cut a work piece having a plurality of dissimilar surfaces of revolution, said cutter assemblies being different and together having cutter portions adapted to engage each of said surfaces of revolution, said cutter portions being divided between said opposed assemblies, each of said assemblies having cutter portions adapted to engage surfaces of revolution substantially adjacent both ends of the work piece.

50. A method of continuously machining work pieces to circular section which comprises constantly rotating a pair of opposed cutters, translating a pair of separated work supports such that one approaches said cutters and the other moves away from said cutters, terminating translation when said one work support has reached predetermined depth in the cutting zone between said cutters, rotating said one work support, utilizing the interval of rotation to load said other work support, terminating rotation of said one work support and reversely translating said supports.

51. A method of continuously machining work pieces to circular section which comprises constantly rotating a pair of opposed cutters, rapid traversing a pair of separated work supports such that one approaches said cutters and the other moves away from said cutters, slowly feeding said work supports as said one support enters the cutting zone between said cutters, terminating said feed when said one work support has reached predetermined depth in the cutting zone between said cutters, rotating said one work support, utilizing the interval of rotation to load said other work support, terminating rotation of said one work support and reversely repeating the cycle.

52. In a machine of the character described, a pair of opposed roughing cutters, a finishing cutter, a work support, means for rotating said cutters, means for rotating a work piece on said work support, means for feeding said work support to a position intermediate said roughing cutters, means for there arresting feed of said work support until said work piece has completed a predetermined rotation, and means for feeding said work support in the same direction through said opposed roughing cutters into engagement with said finishing cutter.

53. In a machine of the character described, a frame, a work support and a tool support mounted on said frame for relative movement, a separate work motor and tool motor and respective transmissions for rotating each of said supports, means for relatively feeding said supports, means effective during such relative feeding movement for continuously energizing said tool motor, means effective during at least the major portion of said feeding movement to prevent energization of said work motor, whereby said work motor and the work drive transmission retain said work support rigidly against rotation.

54. In a machine of the character described, a frame, a work support and a tool support mounted on said frame for relative movement, a separate work motor and tool motor and respective transmissions for rotating each of said supports, means for relatively feeding said supports, said work motor and transmission being effective to retain said work support rigidly against rotation when deenergized, control means effective to energize said tool motor, means for relatively feeding aid tool support and work support, said control means being effective to prevent energization of said work motor until said relative feeding motion is at least substantially complete and for thereafter energizing said motor to rotate said work piece to machine said work piece.

55. A machine of the class described comprising a frame, a pair of opposed milling cutters, means for rotating said cutters continuously, a work spindle, a carriage for said spindle movable in straight line relation in a direction perpendicular to the plane containing the axes of said cutters to a position intermediate said cutters, and means effective to rotate said work spindle or to lock said spindle against rotation.

56. A machine tool comprising a frame, a pair of opposed spindles carried by said frame, a third spindle mounted for rectilinear movement from a position remote from said opposed spindles to a position intermediate said spindles, motor means for rotating said pair of spindles, other motor means for rotating said third spindle, means for feeding said third spindle to a position of rest intermediate said pair of spindles, and control means for energizing one of said motor means during said feeding motion, and for energizing the other of said motor means while continuing energization of said one motor means upon termination of said feeding motion.

57. A machine tool of the character described comprising a frame, a pair of opposed spindles carried by said frame, a third spindle, said third spindle and said opposed spindles being mounted for relative movement so as to position said third spindle intermediate said opposed spindles, at least one of said spindles being a work supporting spindle, independent motor means for rotating said work supporting spindle, including transmission means adapted to lock said spindle against rotation when said motor means is deenergized, means for relatively feeding said opposed spindles and said third spindle, control means for retaining said motor means deenergized until said relative feeding motion is at least substantially complete, said control means effective to energize said motor means substantially upon completion of said relative feeding motion.

58. A machine tool of the character described comprising a frame, a pair of opposed spindles carried by said frame, a third spindle, said third spindle and said opposed spindles being mounted for relative movement so as to position said third spindle intermediate said opposed spindles, at least one of said spindles being a work supporting spindle, independent motor means for rotating said work supporting spindle, including transmission means adapted to lock said spindle against rotation when said motor means is deenergized, means for relatively feeding said opposed spindles and said third spindle, control means for energizing said feeding means and retaining said motor means deenergized, said control means effective thereafter for terminating said relative feed and energizing said motor means.

59. A machine tool of the character described comprising a frame, a pair of opposed spindles carried by said frame, a third spindle, said third spindle and said opposed spindles being mounted for relative movement so as to position said third spindle intermediate said opposed spindles, at least one of said spindles being a work supporting spindle, independent motor means for rotating said work supporting spindle, including transmission means adapted to lock said spindle against rotation when said motor means is deenergized, means for relatively feeding said opposed spindles and said third spindle, control means for energizing said feeding means and retaining said motor means deenergized, said control means effective thereafter for terminating said relative feed and energizing said motor means, said control means effective thereafter to reverse said relative feed motion and to deenergize said motor means.

CHARLES B. DE VLIEG.